US012719569B1

(12) United States Patent
Valdez et al.

(10) Patent No.: US 12,719,569 B1
(45) Date of Patent: Aug. 25, 2026

(54) METHOD AND SYSTEM FOR COMMUNICATING BETWEEN MOBILE DEVICES CONNECTED TO PON DEVICES

(71) Applicant: FRONTIER COMMUNICATIONS HOLDINGS, LLC, Dallas, TX (US)

(72) Inventors: John Valdez, Copper Canyon, TX (US); James Steacy, Dallas, TX (US); Bryan Pauling, Rochester, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 19/370,541

(22) Filed: Oct. 27, 2025

(51) Int. Cl.
*H04B 10/03* (2013.01)
*H04Q 11/00* (2006.01)

(52) U.S. Cl.
CPC ......... *H04B 10/03* (2013.01); *H04Q 11/0067* (2013.01); *H04Q 2011/0081* (2013.01)

(58) Field of Classification Search
CPC ............................ H04B 10/03; H04Q 11/0067
USPC .............................................................. 398/2
See application file for complete search history.

(56) References Cited

U.S. PATENT DOCUMENTS 9,755,736 B2 * 9/2017 Kim ..................... H04B 10/071
10,018,799 B2 7/2018 Gu et al.
10,477,511 B2 11/2019 Ohlarik et al.
10,756,818 B2 8/2020 Vardarajan et al.
11,102,660 B2 8/2021 Dabrowski et al.
11,197,262 B2 12/2021 Soma et al.
11,356,177 B1 * 6/2022 Valdez ............... H04B 10/0773
11,375,449 B2 6/2022 Moreman et al.
11,665,454 B1 * 5/2023 Valdez .............. H04Q 11/0067 398/72
11,962,343 B1 * 4/2024 Alba .................. H04B 10/0793
12,136,944 B1 * 11/2024 Valdez .............. H04B 10/0793
12,199,814 B1 * 1/2025 Valdez .................... G06T 11/00
(Continued)

FOREIGN PATENT DOCUMENTS

CN 202798721 U * 3/2013
CN 106464369 A * 2/2017 ........... H04B 10/272
(Continued)

OTHER PUBLICATIONS

U.S. Appl. No. 18/636,808, Non-final Office Action, dated Jun. 11, 2024.
(Continued)

*Primary Examiner* — Amritbir K Sandhu

(57) ABSTRACT

Techniques for communicating between client devices connected to components in a Passive Optical Network (PON) include establishing a communication session with an optical network terminal (ONT) in a PON via a short-range communication link. The PON includes an optical line terminal (OLT) optically connected to the ONT via one or more optical fibers. Furthermore, the techniques include presenting an indication of a second client device communicating with a component in the PON optically coupled to the ONT, where the ONT is downstream of the component. Additionally, the techniques include establishing a messaging session between the first client device and the second client device, and receiving a communication from the second client device indicating a repair status of the component in the PON, where repair of the ONT depends on the repair status of the component.

20 Claims, 16 Drawing Sheets

(56) References Cited

U.S. PATENT DOCUMENTS

| | | | |
|---|---|---|---|
| 12,267,104 B1 | 4/2025 | Valdez et al. | |
| 2004/0160905 A1* | 8/2004 | Bernier | H04W 88/00 370/310 |
| 2005/0105873 A1* | 5/2005 | Reagan | H04Q 1/14 385/135 |
| 2007/0217788 A1 | 9/2007 | Gao et al. | |
| 2008/0031621 A1 | 2/2008 | Kuo et al. | |
| 2010/0272436 A1* | 10/2010 | Mizutani | H04Q 11/0067 398/25 |
| 2011/0255860 A1* | 10/2011 | Lee | G01M 11/3136 398/10 |
| 2012/0007533 A1 | 1/2012 | Ogawa et al. | |
| 2012/0075343 A1 | 3/2012 | Chen et al. | |
| 2015/0091780 A1 | 4/2015 | Lyren | |
| 2018/0006719 A1 | 1/2018 | Cress et al. | |
| 2018/0262533 A1 | 9/2018 | McCaig et al. | |
| 2018/0337785 A1 | 11/2018 | Sanciangco et al. | |
| 2022/0141082 A1 | 5/2022 | Brun et al. | |
| 2024/0171524 A1 | 5/2024 | Bostoen et al. | |
| 2024/0177436 A1 | 5/2024 | Ito et al. | |

FOREIGN PATENT DOCUMENTS

| | | |
|---|---|---|
| WO | WO-9914929 | 3/1999 |
| WO | WO-2011048207 | 4/2011 |

OTHER PUBLICATIONS

U.S. Appl. No. 18/636,808, Notice of Allowance, dated Sep. 3, 2024.

U.S. Appl. No. 18/636,823, Final Office Action, dated Aug. 29, 2024.

U.S. Appl. No. 18/636,823, Non-final Office Action, dated Jun. 21, 2024.

U.S. Appl. No. 18/636,823, Notice of Allowance, dated Nov. 18, 2024.

U.S. Appl. No. 18/889,728, Non-final Office Action, dated Nov. 20, 2024.

U.S. Appl. No. 18/889,728, Notice of Allowance, dated Jan. 22, 2025.

U.S. Appl. No. 18/962,086, Final Office Action, dated Apr. 17, 2025.

U.S. Appl. No. 18/962,086, Non-final Office Action, dated Jan. 31, 2025.

U.S. Appl. No. 18/962,086, Notice of Allowance, dated Jul. 15, 2025.

U.S. Appl. No. 19/062,499, Non-final Office Action, dated Apr. 24, 2025.

U.S. Appl. No. 19/062,499, Notice of Allowance, dated Jul. 1, 2025.

U.S. Appl. No. 19/322,389, Nonfinal Office Action, dated Dec. 10, 2025.

U.S. Appl. No. 19/380,720, Nonfinal Office Action, dated Jan. 13, 2026.

* cited by examiner

Figure 5:
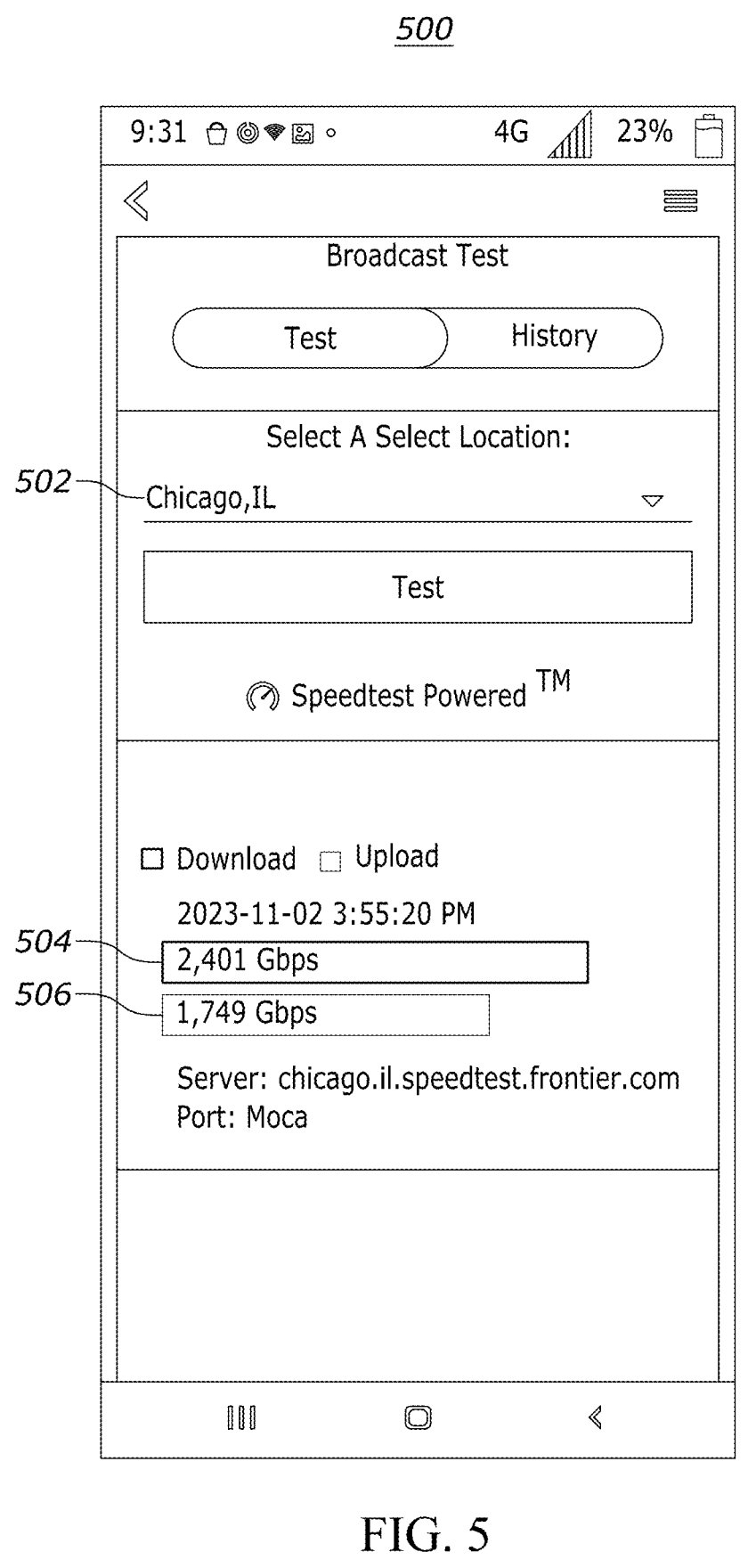

Broadcast Test

Test History

Select A Select Location:

502 Chicago,IL

Test

Speedtest Powered TM

Download Upload 2023-11-02 3:55:20 PM 504 2,401 Gbps 506 1,749 Gbps

Server: chicago.il.speedtest.frontier.com

Port: Moca

Figure 6A:
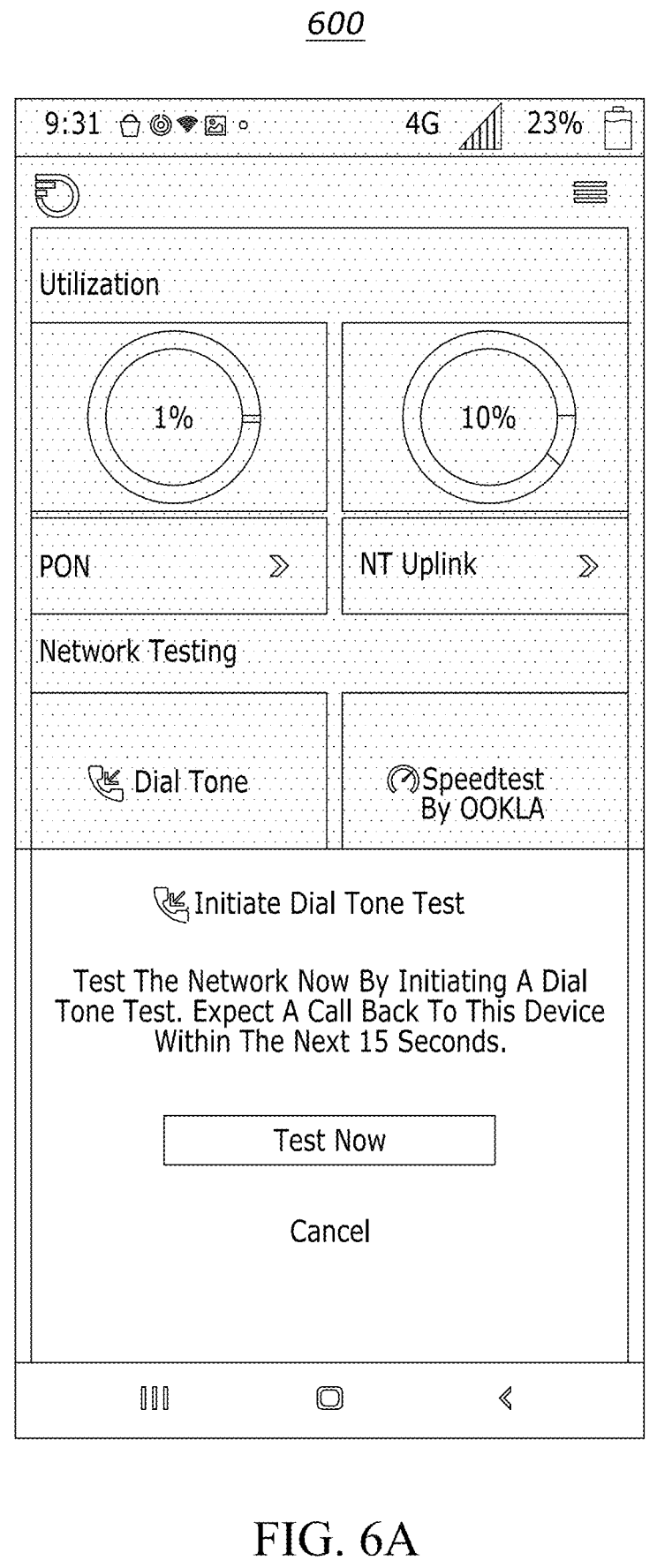

Utilization

1%

10%

PON

NT Uplink

Network Testing

Dial Tone

Speedtest By OOKLA

Initiate Dial Tone Test

Test The Network Now By Initiating A Dial Tone Test. Expect A Call Back To This Device Within The Next 15 Seconds.

Test Now

Cancel

METHOD AND SYSTEM FOR COMMUNICATING BETWEEN MOBILE DEVICES CONNECTED TO PON DEVICES

FIELD OF THE DISCLOSURE

This disclosure relates generally to passive optical networks (PONs), and, more particularly, to a messaging service for communicating between mobile devices connected to PON devices to synchronize repairs.

BACKGROUND

A conventional PON includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

When a PON experiences a network failure (e.g., equipment malfunctions, signal loss, network congestion, broken optical fibers, or other technical issues), the effects are typically observed by customers or end-users at locations at which last mile termination units are disposed. For example, a customer may observe a slowing down or lack of fidelity of PON services at his or her location, and may contact the PON service provider for assistance.

However, a technician typically needs to have years of experience with troubleshooting to understand how to properly repair the network failure. Additionally, the technician may have difficulty locating the network equipment within a customer's residence. Moreover, it can be time consuming for the technician to correctly diagnose the problem before beginning the repair. Even if the technician is able to read information from the ONT, technicians may need years of training and experience before they can quickly identify the problem and resolve the issue.

SUMMARY

To prevent a first technician from attempting to repair a device in the PON (e.g., an LMTU) while a second technician is repairing an upstream PON device (e.g., an FDT, an FDH, an OLT, etc.), a PON repair application establishes a messaging session between the technicians via their respective client devices. Then the second technician repairing the upstream PON device can provide repair status updates to the first technician repairing the downstream PON device. Once repair of the upstream PON device is complete, the first technician can determine whether the downstream PON device is operational for example, by receiving diagnostic information from the downstream PON device. The first technician can then begin repairing the downstream PON device if it still is not operational after the upstream PON device has been repaired.

In other scenarios, the first technician repairing the downstream PON device may message the second technician letting the second technician know that the downstream PON device is being repaired before the second technician begins repairing the upstream PON device. The second technician may wait to see if the downstream PON device is operational after repairs before diagnosing and/or repairing the upstream PON device. If the downstream PON device is not operational after repairs, the second technician may diagnose and/or repair the upstream PON device to resolve the network failure in the PON.

Also in some scenarios, the second technician repairing the upstream PON device may communicate with several technicians for several downstream PON devices, for example in a group messaging session. In this manner, the technicians for the downstream PON devices may wait to diagnose and/or repair their respective downstream PON devices until the second technician has completed repair of the upstream PON device. Additionally or alternatively, the second technician may wait for the downstream PON devices to be repaired to see if at least one of the downstream PON devices is operational after repair. If none of the technicians are able to repair at least one of the downstream PON devices, the second technician may diagnose and/or repair the upstream PON device to resolve the network failure in the PON.

In this manner, service technicians can efficiently diagnose and repair PON devices in the PON without wasting time working on a downstream PON device which cannot be operational while the upstream PON device is being repaired. A PON repair application executing on a technician's client device can provide instructions for repairing a PON device based on the messages communicated between the technicians. For example, the instructions may be to wait until repair of the upstream PON device is complete. This improves the PON repair application by providing instructions which are more likely to result in a successful repair. This also improves the connectivity of the PON by efficiently utilizing technicians to reduce downtime in the PON.

The PON repair application may provide step-by-step instructions for repairing a PON device. In some implementations, the client device includes a transparent display, such as a camera view depicting the area in front of the user in the camera view. For example, the client device may be a wearable device such as a virtual reality (VR) and/or augmented reality (AR) headset or smart glasses. When the user is facing the PON device, the transparent display may include a camera view of the PON device with the step-by-step instructions overlaid on the transparent display. The instructions may be presented in an area of the transparent display which does not obstruct the user's view of the PON device, so that the user can simultaneously view the instructions and the PON device to perform the repairs while reading the instructions.

Additionally, the client device may overlay AR features on the transparent display to further guide the user when making the repair. For example, the client device may analyze images in the camera view to identify objects within the camera view, such as the PON device, ports on the PON device, light emitting diodes (LEDs) on the PON device, etc. The client device may then overlay AR features to highlight certain portions of the PON device corresponding to the instructions for repairing the PON device. For example, an instruction may be to replace a particular optical fiber connected to the PON device at a particular port. The client device may overlay an AR feature (e.g., a transparent green oval) over a port in the PON device for connecting the optical fiber. By overlaying AR features over portions of the camera view that correspond to the instructions, the client device makes it easier for the user to successfully perform the repair. This may increase the speed and the success rate of repairs for PON devices.

In an embodiment, a method for communicating between client devices connected to components in a PON is provided. The method includes establishing a communication session, by a first client device via a short-range communication link, with an ONT in a PON. The PON includes an OLT optically connected to the ONT via one or more optical fibers. The method also includes presenting, by the first client device via a PON repair application, an indication of a second client device communicating with a component in the PON optically coupled to the ONT. The ONT is downstream of the component. Additionally, the method includes establishing, by the first client device via a messaging service of the PON repair application, a messaging session between the first client device and the second client device, and receiving, by the first client device via the messaging service in the PON repair application, a communication from the second client device indicating a repair status of the component in the PON. Repair of the ONT depends on the repair status of the component.

In another embodiment, a first client device for communicating between client devices connected to components in a PON includes one or more processors, and a non-transitory computer-readable memory storing instructions thereon. When executed by the one or more processors, the instructions cause the first client device to establish a communication session, via a short-range communication link, with a particular optical network terminal (ONT) in a PON. The PON includes an optical line terminal (OLT) optically connected to the ONT via one or more optical fibers. The instructions further cause the first client device to present, via a PON repair application, an indication of a second client device communicating with a component in the PON optically coupled to the ONT. The ONT is downstream of the component. Additionally, the instructions cause the client device to establish, via a messaging service of the PON repair application, a messaging session between the first client device and the second client device, and receive, via the messaging service in the PON repair application, a communication from the second client device indicating a repair status of the component in the PON. Repair of the ONT depends on the repair status of the component.

In yet another embodiment, a method for establishing a messaging session between client devices connected to components of a PON which are optically coupled to each other is provided. The method includes receiving an indication of a first client device in communication with an optical network terminal (ONT) in a PON and receiving an indication of a second client device in communication with a component in the PON optically coupled to the ONT. The ONT is downstream of the component. Additionally, the method includes initiating a messaging session between the first and second client devices, receiving a communication from the second client device indicating a repair status of the component in the PON, and transmitting the communication to the first client device to alert the first client device of the repair status of the component.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

FIGS. 3A-3C illustrate example displays of a PON repair application for connecting to a particular ONT by searching for the particular ONT and identifying a Wi-Fi signal broadcasted by the particular ONT, which may be presented on a client device.

FIG. 5 illustrates an example display of a PON repair application for executing a speed test for the particular ONT, which may be presented on a client device.

FIGS. 6A and 6B illustrate example displays of a PON repair application for executing a dial tone test for the particular ONT, which may be presented on a client device.

Figure 1:
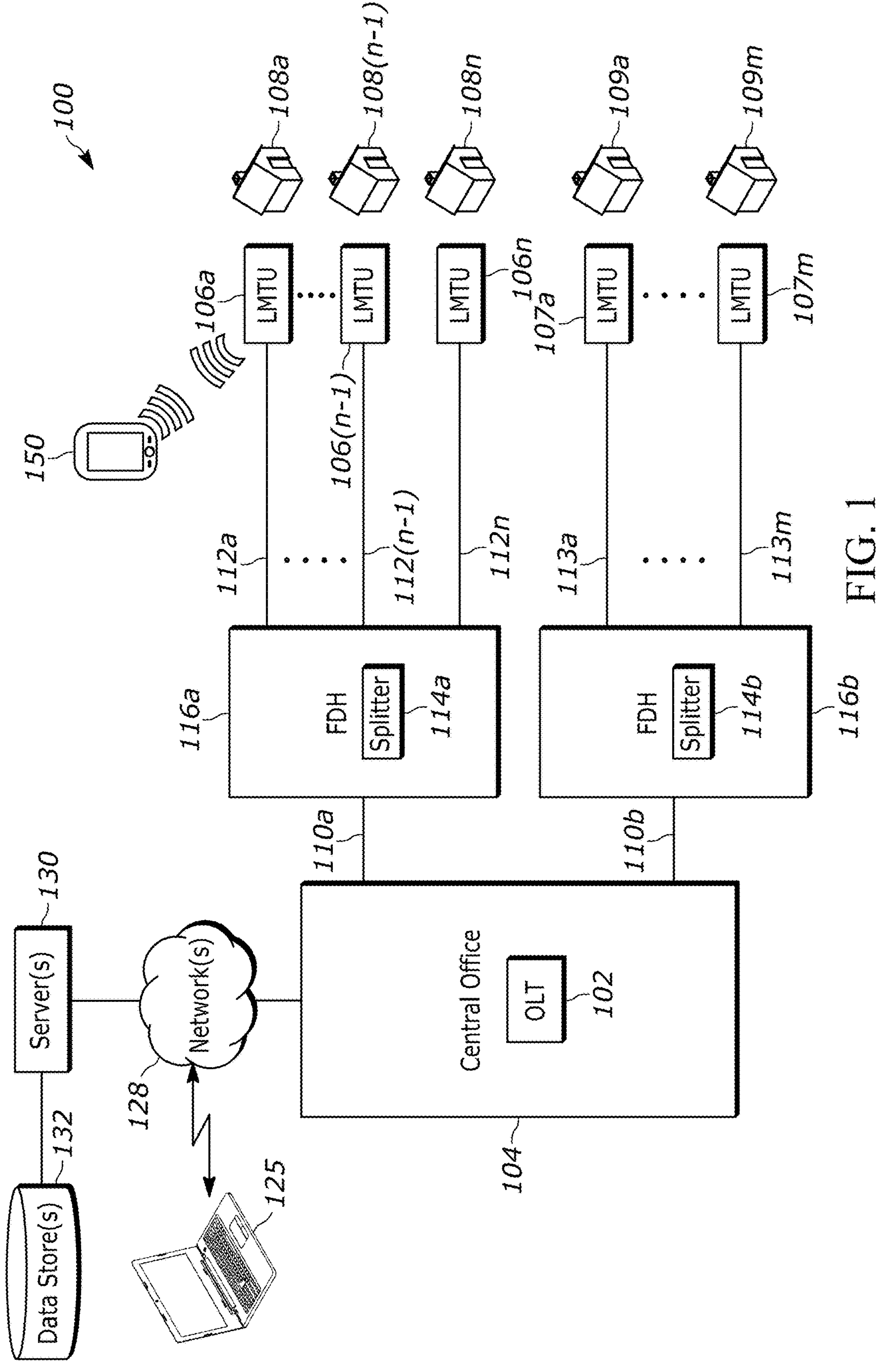
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Examples of the disclosure provide a number of advantages over existing techniques for identifying connected ports within a PON. Reference will now be made in detail to non-limiting examples, some of which are illustrated in the accompanying drawings.

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units 106*a*, . . . , 106*n* at respective customer premises 108*a*, . . . , 108*n*. The last mile termination units 106*a*, . . . , 106*n* may be located outside and/or inside the customer premises or locations 108*a*, . . . , 108*n*. Each last mile termination unit 106*a*, . . . , 106*n* may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110*a* from the OLT 102 (which is interchangeably referred to herein as an "F1 optical fiber 110*a*" or a "primary optical fiber 110*a*") serves the one or more last mile termination units 106*a*, . . . , 106*n* via respective distribution optical fibers 112*a*, . . . , 112*n* (which are interchangeably referred to herein as "F2 optical fibers 112*a*, . . . , 112*n*" or "secondary optical fibers 112*a*, . . . , 112*n*"). In the illustrated example, the first feeder optical fiber 110*a* is optically coupled to the plurality of last mile termination units 106*a*, . . . , 106*n* via an example one-to-many optical splitter 114*a* which is disposed, located, implemented, etc. in an example fiber distribution hub (FDH) 116*a*. The one-to-many optical splitter 114*a* includes a first subset distribution ports for connecting the distribution optical fibers 112*a*, . . . , 112*n*. In some arrangements, the FDH 116*a* is located within a geographic area (e.g., a neighborhood) such that the customer premises 108*a*, . . . , 108*n* are proximally close to the FDH 116*a*, and typically each of the customer premises 108*a*, . . . , 108*n* and respective last mile termination units 106*a*, . . . , 106*n* is disposed at a different optical distance from the FDH 116*a*. An "optical distance," as generally utilized herein, refers to a distance over which an optical signal travels.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110*b* from the OLT 102 that is optically coupled to another plurality of last mile termination units 107*a*-107*m* at respective customer premises 109*a*-109*m* via another many-to-one optical splitter 114*b* having a second subset of distribution ports and included in another fiber distribution hub 116*b* and via respective secondary optical fibers 113*a*-113*m*.

The "components" of the PON 100 or "PON devices," as used interchangeably herein, generally refer to the devices, nodes, and optical fibers of the PON 100. For example, the components of the PON 100 or PON devices shown in FIG. 1 may include the OLT 102, the FDHs 116*a*, 116*b*, the optical splitters 114*a*, 114*b*, the LMTUs 106*a*-106*n* and 107*a*-107*m*, and the optical fibers interconnecting the devices or nodes, e.g., the optical fibers 110*a*-110*b*, 112*a*-112*n*, and 113*a*-113*m*.

In some scenarios, an optical terminal (e.g., the OLT 102 and/or one or more the last mile termination units 106*a*-106*n*, 107*a*-107*m*) communicates with a computing device. For example, the OLT 102 and/or the one or more LMTUs 106*a*-106*n*, 107*a*-107*m* may transmit or receive data from a computing device 125 (e.g., a laptop, a computer, a tablet, a mobile phone, etc.) associated with a service technician or other agent of the PON 100 or a computing device associated with a customer.

In some examples, the computing device 125 communicates with an LMTU 106*a*-106*n*, 107*a*-107*m* via one or more networks 128 (which may include one or more wired and/or wireless private networks and/or public networks, such as the Internet). In other examples, a client computing device 150 (also referred to herein as a "client device") communicates directly with the LMTU 106*a*-106*n*, 107*a*-107*m* by establishing a communication session with the LMTU 106*a*-106*n*, 107*a*-107*m* over a short-range communication link, such as Bluetooth, Wi-Fi, or near field communication (NFC). The client device 150 may also be associated with a service technician, other agent of the PON 100, or a customer. Then during the communication session, the client device 150 and the LMTU 106*a*-106*n*, 107*a*-107*m* may directly transmit information back and forth to each other. For example, the LMTU 106*a*-106*n*, 107*a*-107*m* may transmit diagnostic information to the client device 150 which may be presented on a user interface of the client device 150 via a PON repair application. The client device 150 may transmit control signals to the LMTU 106*a*-106*n*, 107*a*-107*m* for the LMTU 106*a*-106*n*, 107*a*-107*m* to perform diagnostic tests, such as a dial tone test or a speed test.

The client device 150 may be a portable device such as a smart phone or a tablet computer, for example. The client device 150 may also be a laptop computer, a desktop computer, a personal digital assistant (PDA), a wearable device such as a smart watch or smart glasses, a virtual reality headset, etc.

The client device 150 may include one or more processor(s) and a memory storing machine-readable instructions executable on the processor(s). The processor(s) may include one or more general-purpose processors (e.g., CPUs), and/or special-purpose processing units (e.g., graphical processing units (GPUs)). The memory may be a non-transitory memory and can include one or several suitable memory modules, such as random access memory (RAM), read-only memory (ROM), flash memory, other types of persistent memory, etc. The memory may store instructions for implementing a PON repair application for directly connecting to an LMTU 106*a*-106*n*, 107*a*-107*m* and establishing a communication session with the LMTU 106*a*-106*n*, 107*a*-107*m* to receive diagnostic information for identifying the cause of a network failure. The PON repair application may also provide instructions for repairing the LMTU 106*a*-106*n*, 107*a*-107*m* and/or may present other graphical indications to guide a user through a repair. Furthermore, the PON repair application may include a messaging service for initiating a messaging session between the client device 150 and another client device connected to a component of the PON, such as a component upstream of the LMTU 106*a*-106*n*, 107*a*-107*m*.

Additionally, the client device 150 may include sensors, such as a positioning sensor (e.g., a Global Positioning System (GPS)), an accelerometer, an infrared sensor, a camera, a depth sensor such as a light detection and ranging (lidar) sensor, an electromagnetic sensor, etc. The client device 150 may also include a network interface for communicating with devices over short-range communication links, such as Bluetooth, Wi-Fi, or NFC. The network interface may enable communication with other devices (e.g., the OLT 102, the last mile termination units 106*a*, 106*n*, the one or more servers 130, the computing device 125, etc.) via any suitable networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

Furthermore, the client device 150 may include a display. The display may be a transparent display with camera views of real-world imagery. For example, when the client device 150 is smart glasses or a virtual reality headset, the transparent display may be presented in front of the user's eyes. Then the client device 150 may present augmented reality features on the transparent display overlaying the real-world imagery to help guide the user.

Additionally and/or alternatively, the client device 150 or an optical terminal in the PON 100 may communicate with one or more servers 130 of the PON 100 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management, administrative, and/or test functionalities of the PON 100.

In another example, the PON repair application may communicate with the server(s) 130 to transmit diagnostic information to the server(s), receive repair instructions from the server(s) 130, receive a description of an identified root cause of the network failure from the server(s), receive records of the FDHs, splitters, distribution ports, and ONTs connected to the distribution ports, transmit updated connection information regarding the ONTs and distribution ports, etc.

In yet another example, the one or more servers 130 may identify client devices 150 connected to PON devices which are upstream or downstream of each other. For example, when a client device 150 connects to a PON device, the client device 150 may transmit a notification to the one or more servers 130 of the PON device connected to the client device 150. The one or more servers 130 may maintain records of the OLT, FDTs, FDHs, splitters, distribution ports and/or ONTs connected to each other and may identify when multiple client devices are connected to PON devices which are upstream or downstream of each other. Then the one or more servers 130 may initiate a messaging session between the client devices. For example, the one or more servers 130 may transmit notifications to the client devices indicating that one or more other client devices are connected to downstream or upstream PON devices. Then in response to receiving a request to initiate a messaging session between the client devices, the one or more servers 130 may transmit messages back and forth between the client devices.

More specifically, the one or more servers 130 may receive user profile information for each of the service technicians connected to downstream or upstream PON devices, such as a user identifier. Then the one or more servers 130 may generate a messaging display which presents the content of messages from each client device associated with a user profile of a service technician connected to a set of PON devices which are downstream or upstream of each other. The one or more servers 130 may then transmit the messaging display and updates including additional content to the client devices associated with the user profiles of the service technicians connected to downstream or upstream PON devices. For example, the one or more servers 130 may receive a communication from a second client device indicating a repair status of an upstream PON device. Then the one or more servers 130 may transmit the communication to a first client device connected to a downstream PON device (e.g., an ONT) to alert the first client device of the repair status of the upstream PON device.

In some implementations, the entire functionality of the PON repair application may be executed on the server(s) 130. In other implementations, the PON repair application does not communicate with a server 130 and performs its functionality locally on the client device 150. In yet other implementations, the client device 150 and the server(s) 130 each perform a portion of functionality of the PON repair application.

Various information and data associated with, utilized by, and/or generated by the PON 100 may be stored in the data stores 132 of the PON 100. For example, the data store(s) 132 may store sets of instructions for repairing LMTUs 106*a*-106*n*, 107*a*-107*m*, where each set of instructions corresponds to a different root cause of the network failure. For example, if the root cause is a broken optical fiber 112*a*, the corresponding instructions may be for replacing the optical fiber 112*a*. If the root cause is that the optical fiber 112*a* is dirty, the corresponding instructions may be for cleaning the optical fiber 112*a*. The data store(s) 132 may also store records of customer contact events with a technical support organization supporting the PON 100, service call records, records of operating conditions and events which occurred, logbooks, records of the OLT, FDHs, FDTs, splitters, distribution ports, and ONTs connected to the distribution ports in the PON, and the like.

Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the system 100. Still further, the data store(s) 132 may store data indicative of the architecture, infrastructure, and component connectivity of the PON 100, including identifications of various PON components and indications of which PON components connect to which other PON components. Additionally, the data store(s) 132 may store user profiles for service technicians, such that a service technician can sign into the PON repair application with a user identifier and/or password and view messages from other service technicians connected to upstream or downstream PON devices. Of course, the data store(s) 132 may store any updates to any and all of the information and data stored therein.

The example servers 130, optical terminals (e.g., any of the OLT 102, the last mile termination units 106*a*, 106*n*), and/or the example computing devices 125, 150 may include a processing platform capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform may be, for example, one or more servers, a cloud computing system, a computer, a workstation, a laptop, a mobile device (e.g., a cell phone, a smart phone, a tablet such as an IPAD™), or any other type of computing device or system.

The example processing platform includes one or more processors, one or more memories, one or more network interfaces, one or more input/output (I/O) interfaces, and/or a set of data stores, all of which are interconnected via one or more address/data bus or communication links.

The processors may be implemented using hardware, and may include a semiconductor based (e.g., silicon-based) device. The processors may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processors may be a field programmable gate array (FPGA), an application specific integrated circuit (ASIC), etc. that implements operations of the example methods described herein without executing instructions.

The memories are accessible by the processors (e.g., via a memory controller). The example processors interact with the memories to obtain, for example, machine-readable instructions stored in the memories corresponding to, for example, the operations represented by the flowcharts of this disclosure. The example processors may also interact with the memories to store data, such as data formed or used during execution of machine-readable instructions. Example memories include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform to provide access to the machine-readable instructions stored thereon.

The example processing platform includes one or more communication interfaces such as, for example, the one or more network interfaces, and/or the one or more input/output (I/O) interfaces. The communication interface(s) enable the processing platform to communicate with, for example, another device, system, etc. (e.g., the OLT 102, the last mile termination units 106*a*, 106*n*, the one or more servers 130, the computing device 125, the one or more data stores 132, etc., any other database, and/or any other machine).

The example processing platform includes the network interface(s) to enable communication with other machines (e.g., the OLT 102, the last mile termination units 106*a*, 106*n*, the one or more servers 130, the computing device 125, etc.) via, for example, one or more networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform includes the input/output (I/O) interface(s) (e.g., a Bluetooth® interface, a near-field communication (NFC) interface, a universal serial bus (USB) interface, a serial interface, an infrared interface, a PCI express interface, etc.) to enable the processors to communicate with peripheral I/O devices and/or other communication systems. For example, the I/O interface(s) may be used to control a light source, enable receipt of user input (e.g., from a touch screen, a keyboard, a navigation device such as mouse, touch pad, joystick or trackball, a microphone, a button, etc.) and communicate output data (e.g., visual indicators, instructions, data, images, etc.) to the user (e.g., via a display, a speaker, a printer, a communication interface, an antenna, etc.). The I/O interface(s) typically include a graphics driver card, graphics driver chip and/or graphics driver processor to drive a display when a display is present.

In some examples, the processing platform also includes, or is otherwise communicatively coupled to, a set of data stores or other data storage mechanisms (one or more of a HDD, optical storage drive, solid state storage device, CD, CD-ROM, DVD, Blu-ray disk, RAID, data storage bank, etc.). The set of data stores may include the example data stores 132.

To connect to an LMTU 106*a* to establish a communication session between the client device 150 and the LMTU 106*a*, a user may tap the client device 150 to the LMTU 106*a* to cause the PON repair application to transmit an NFC signal to the LMTU 106*a* requesting to pair the devices. The LMTU 106*a* may receive the NFC signal and establish a communication session between the two devices 150, 106*a* in response to the request. Then the client device 150 and the LMTU 106*a* may transmit NFC communications back and forth to each other with real-time information, such as diagnostic information from the LMTU 106*a*, and control signals from the client device 150 for the LMTU 106*a* to execute diagnostic tests.

In another example, the client device 150 and the LMTU 106*a* may connect via Wi-Fi. For example, the LMTU 106*a* may broadcast a Wi-Fi signal. When the client device 150 is within communication range of the LMTU 106*a*, the PON repair application may receive the Wi-Fi signal and may request to connect to the LMTU 106*a* via the broadcasted Wi-Fi network. In some implementations, the PON repair application may provide a password for connecting to the LMTU 106*a*. The LMTU 106*a* may receive the request and establish a communication session between the two devices 150, 106*a*. In some implementations, the LMTU 106*a* may authenticate the client device 150 using the received password before establishing the communication session. Then the client device 150 and the LMTU 106*a* may transmit Wi-Fi communications back and forth to each other with real-time information, such as diagnostic information from the LMTU 106*a*, and control signals from the client device 150 for the LMTU 106*a* to execute diagnostic tests.

In some implementations, the PON repair application may store a geospatial tag indicating the location of the LMTU 106*a*. For example, the PON repair application may determine the location of the LMTU 106*a* based on the GPS location of the client device 150 while the client device 150 is connected to the LMTU 106*a*. Then when the user is at the same location at a later time, the PON repair application may automatically connect to the Wi-Fi for the LMTU 106*a*. In another example, the PON repair application may determine the location of the LMTU 106*a* based on electromagnetic (EM) data detected from the client device 150 while the client device 150 is connected to the LMTU 106*a*. The PON repair application may compare the EM data to known EM data at various locations to determine the location of the LMTU 106*a*. Still further, if the user has trouble finding the LMTU 106*a*, the PON repair application may use the stored geospatial tag to direct the user to the LMTU 106*a*.

If the user is within communication range of the LMTU 106*a*, the PON repair application may precisely locate the LMTU 106*a* relative to the user's location based on properties of the Wi-Fi signals communicated between the devices. For example, the PON repair application may determine the round trip time (RTT) it takes to transmit a message to the LMTU 106*a* and receive a response message back from the LMTU 106*a*. The PON repair application can determine the distance from the devices 150, 106*a* based on the round trip time for the communications back and forth. For example, the PON repair application can calculate the distance, D, as ½ of c×RTT, where c is the speed of light. Then the PON repair application may present an indication of the distance to the LMTU 106*a* to the user to direct the user to the LMTU 106*a*.

The PON repair application may also determine the direction in which the user needs to travel to locate the LMTU 106*a* based on the angle of arrival of communications between the client device 150 and the LMTU 106*a*. For example, the client device 150 may have multiple antennas for receiving short-range communications. The client device 150 may receive a communication from the LMTU 106*a* at each of its antennas, where the antennas are located at different positions within the client device 150. The PON repair application may then determine the angle of arrival of the communication based on a time difference at which each of the antennas received the communication. In other implementations, the LMTU 106*a* may have multiple antennas for receiving short-range communications and may determine the angle of arrival of a communication based on a time difference at which each of the antennas received the communication. In any event, the PON repair application may present an indication of the direction in which the user needs to travel to locate the LMTU 106*a* to direct the user to the LMTU 106*a*. For example, the PON repair application may present a map display with an indication of the location of the LMTU 106*a* and an indication of the location of the user relative to the LMTU 106*a*. The PON repair application may also provide navigation directions for traveling to the LMTU 106*a*, such as "Go downstairs into the basement and the LMTU 106*a* is to your left."

In other implementations, the PON repair application may determine the direction in which the user needs to travel to locate the LMTU 106*a* based on the EM data and/or accelerometer data. For example, the PON repair application may determine a change in position of the user based on the accelerometer data and/or a change in the EM data. Then the PON repair application may determine the direction in which the user is currently traveling based on the change in position and can provide directions to the LMTU 106*a* using the user's current location and their direction of travel.

In some implementations, the PON repair application may also connect to and/or receive navigation information to other optical terminals in the PON, such as an FDH 116*a*, FDT, or OLT 102.

Figure 6B:
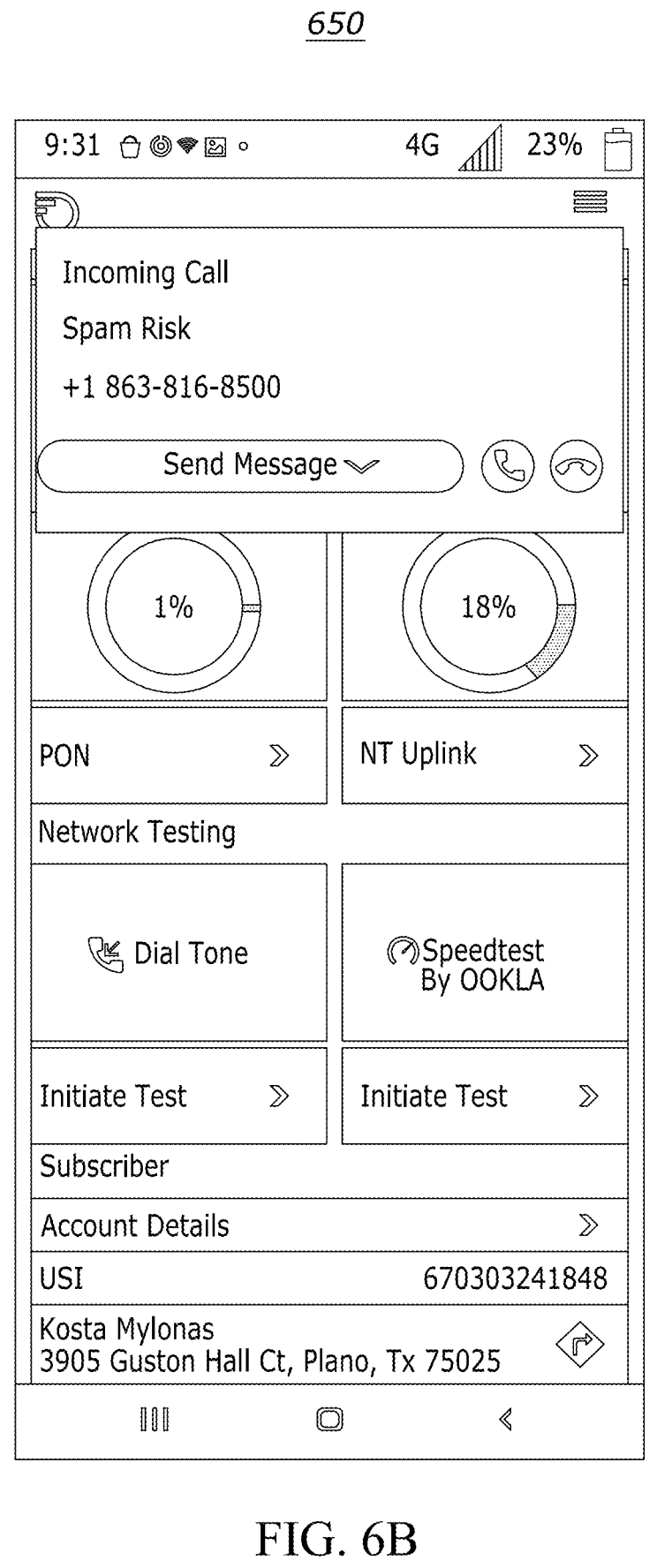
Figure 7:
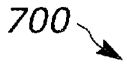
FIG. 7 illustrates an example display of a PON repair application having a user control for initiating a messaging session with another client device of a service technician repairing a PON device upstream of the particular ONT, which may be presented on a client device.
Figure 7:
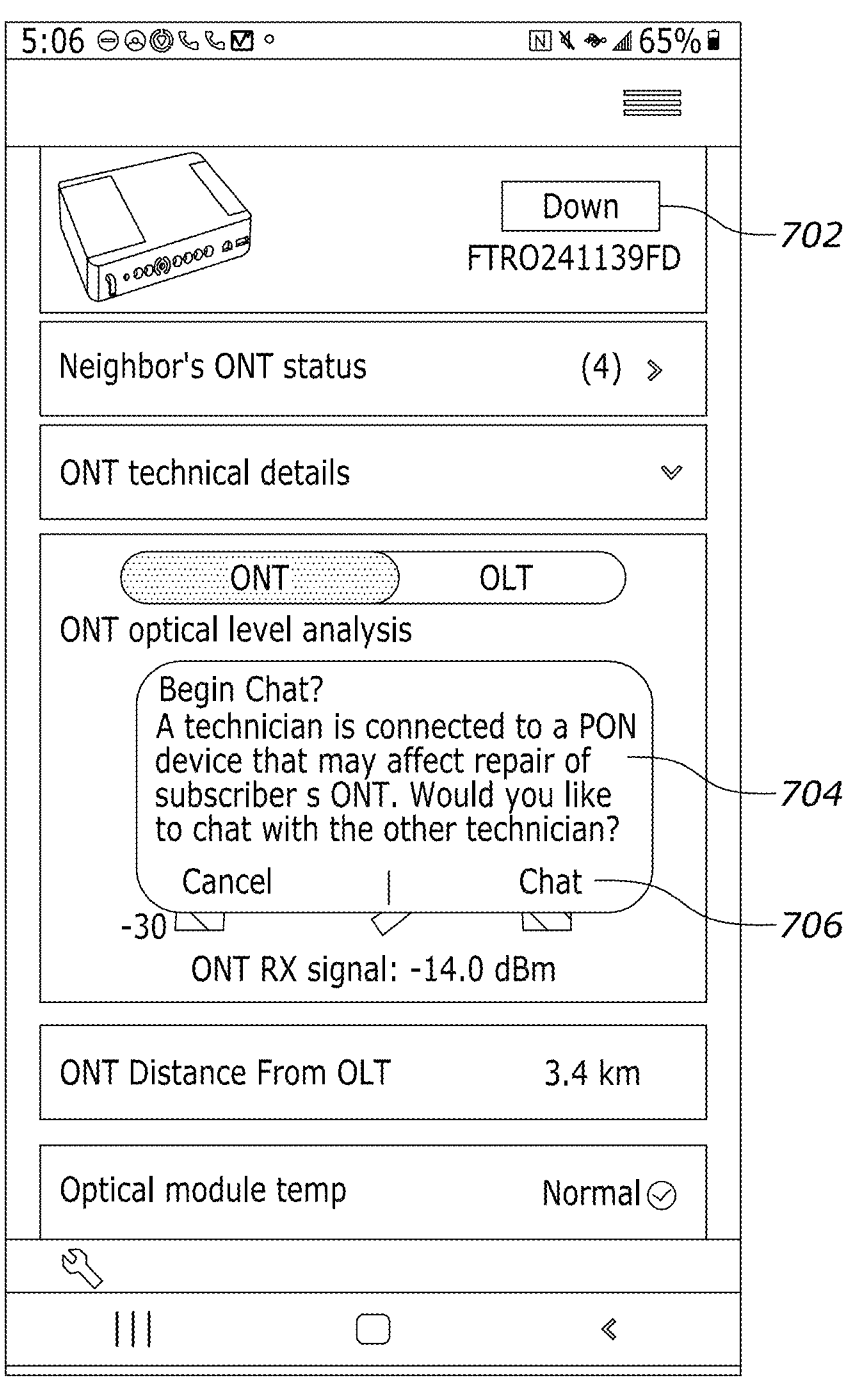
Figure 8:
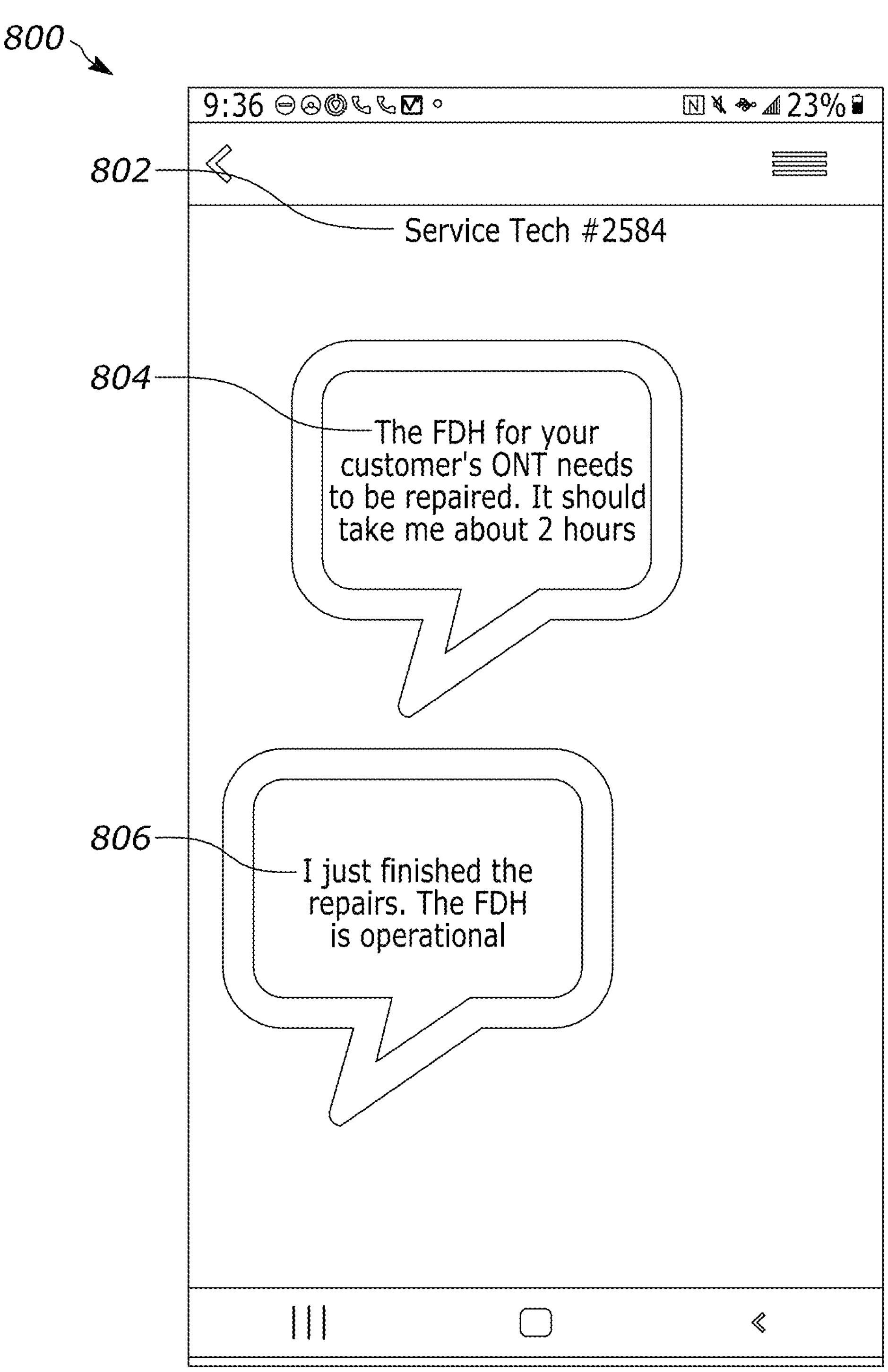
FIG. 8 illustrates an example display of a PON repair application presenting a messaging session between the service technician repairing the particular ONT and the service technician repairing the PON device, which may be presented on a client device.
Figure 9:
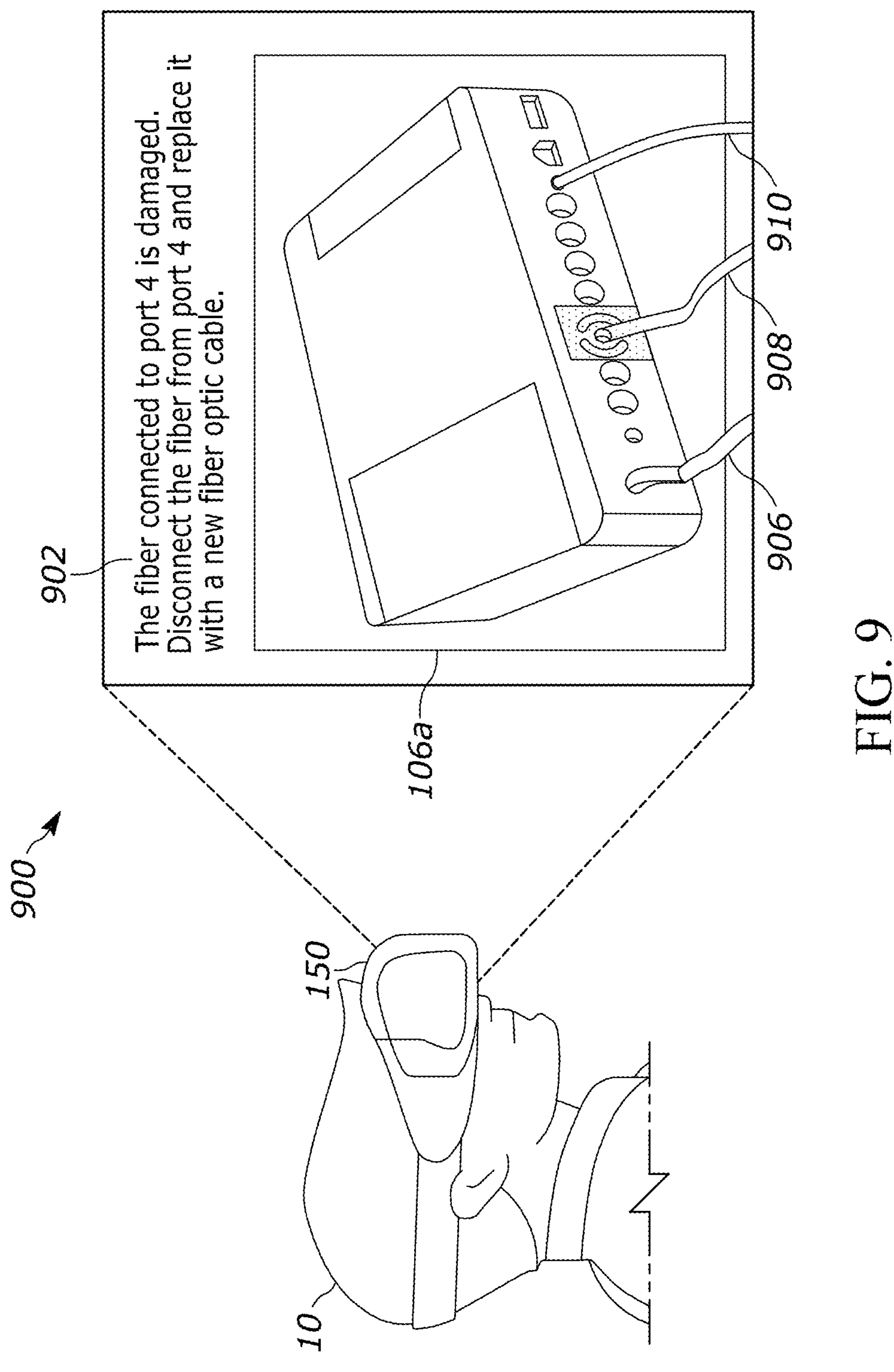
FIG. 9 illustrates an example transparent display of a client device with real-world imagery of the user's field of view which includes the particular ONT and step-by-step instructions for repairing the particular ONT overlaid on the transparent display.
Figure 10:
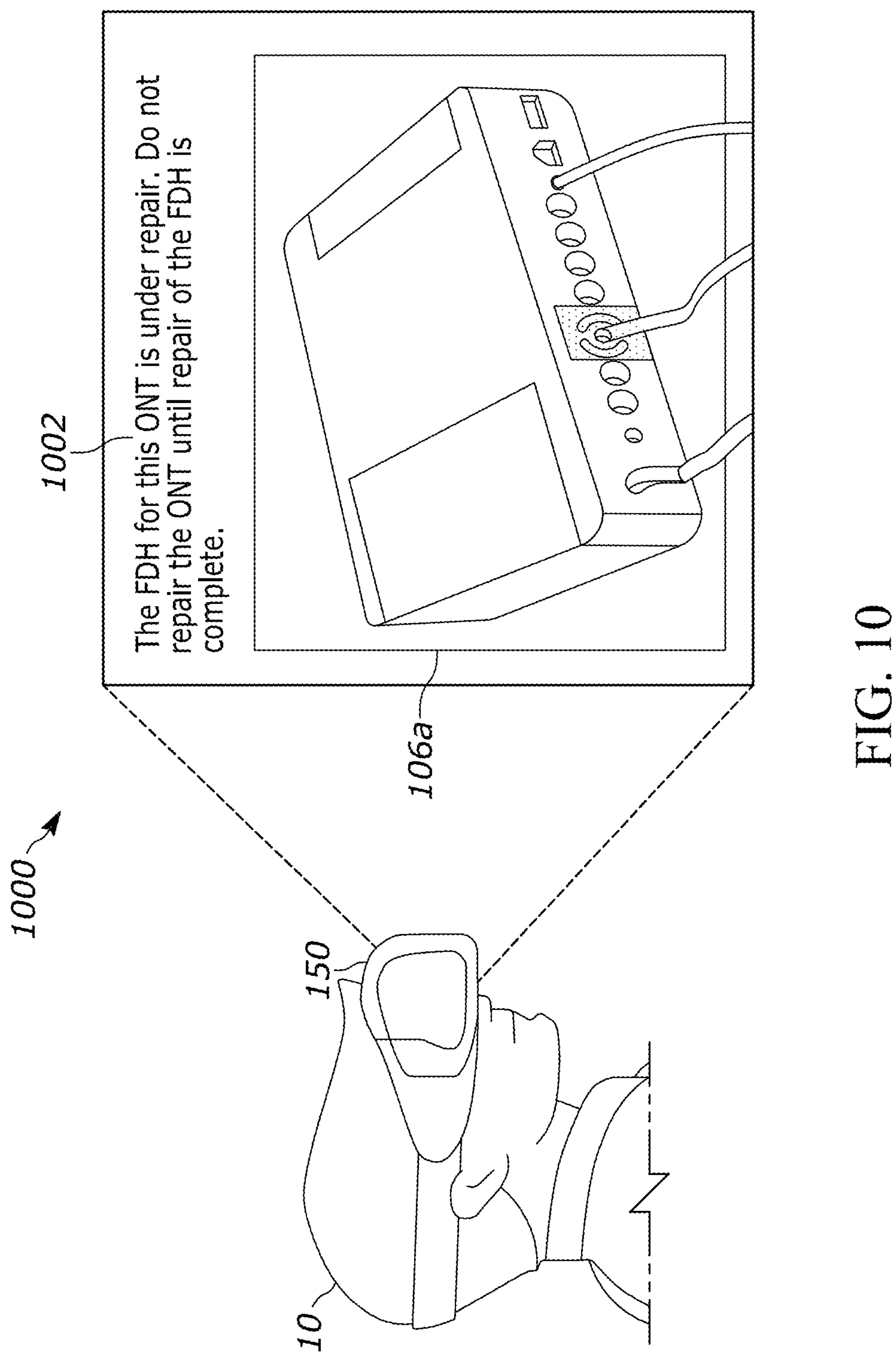
FIG. 10 illustrates another example transparent display of a client device where the step-by-step instructions are adjusted based on the repair status of a PON device upstream of the particular ONT.

FIGS. 2A-3C illustrate example displays 200-360 for connecting to an ONT or other optical terminal which may be presented by the PON repair application on the client device 150. FIGS. 4A-6B illustrate example displays 400-650 for presenting diagnostic information and executing diagnostic tests which may be presented by the PON repair application on the client device 150. FIGS. 7-8 illustrate example displays 700-800 which may be presented by the PON repair application on the client device 150 for initiating and presenting a messaging session between client devices connected to PON devices which are upstream or downstream of each other. FIGS. 9-10 illustrate example displays 900-1000 for providing instructions for repairing an ONT or other optical terminal which may be presented by the PON repair application on the client device 150. The screenshots shown in FIGS. 2A-10 are examples of what may be displayed to a user. As will be appreciated by those of ordinary skill in the relevant art(s), the exemplary screenshots shown in FIGS. 2A-10 are for illustrative purposes, and their associated functionality may be implemented using any suitable format and/or design for facilitating their corresponding described functionalities without departing from the spirit and scope of the present disclosure.

Figure 2A:
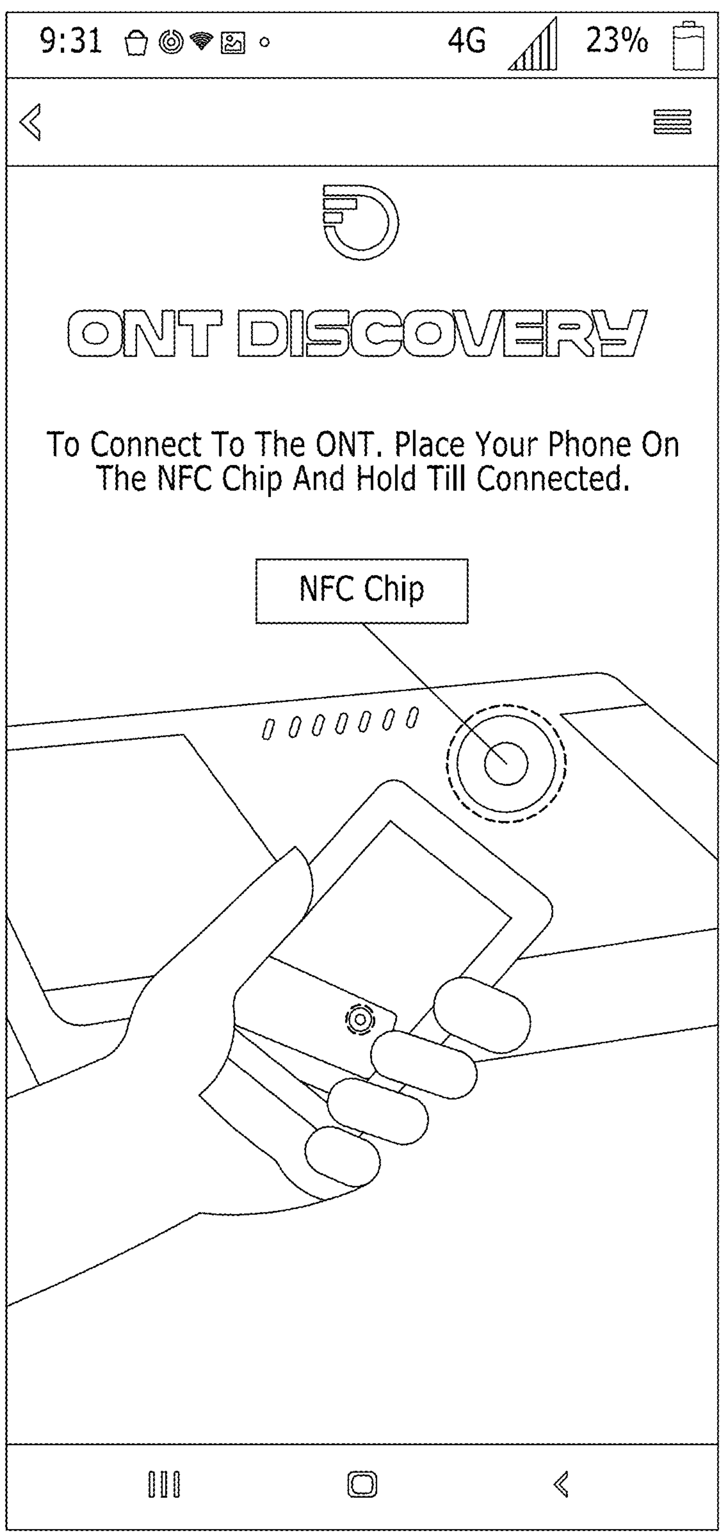
FIGS. 2A and 2B illustrate example displays of a PON repair application for connecting to a particular ONT using NFC, which may be presented on a client device.
Figure 2B:
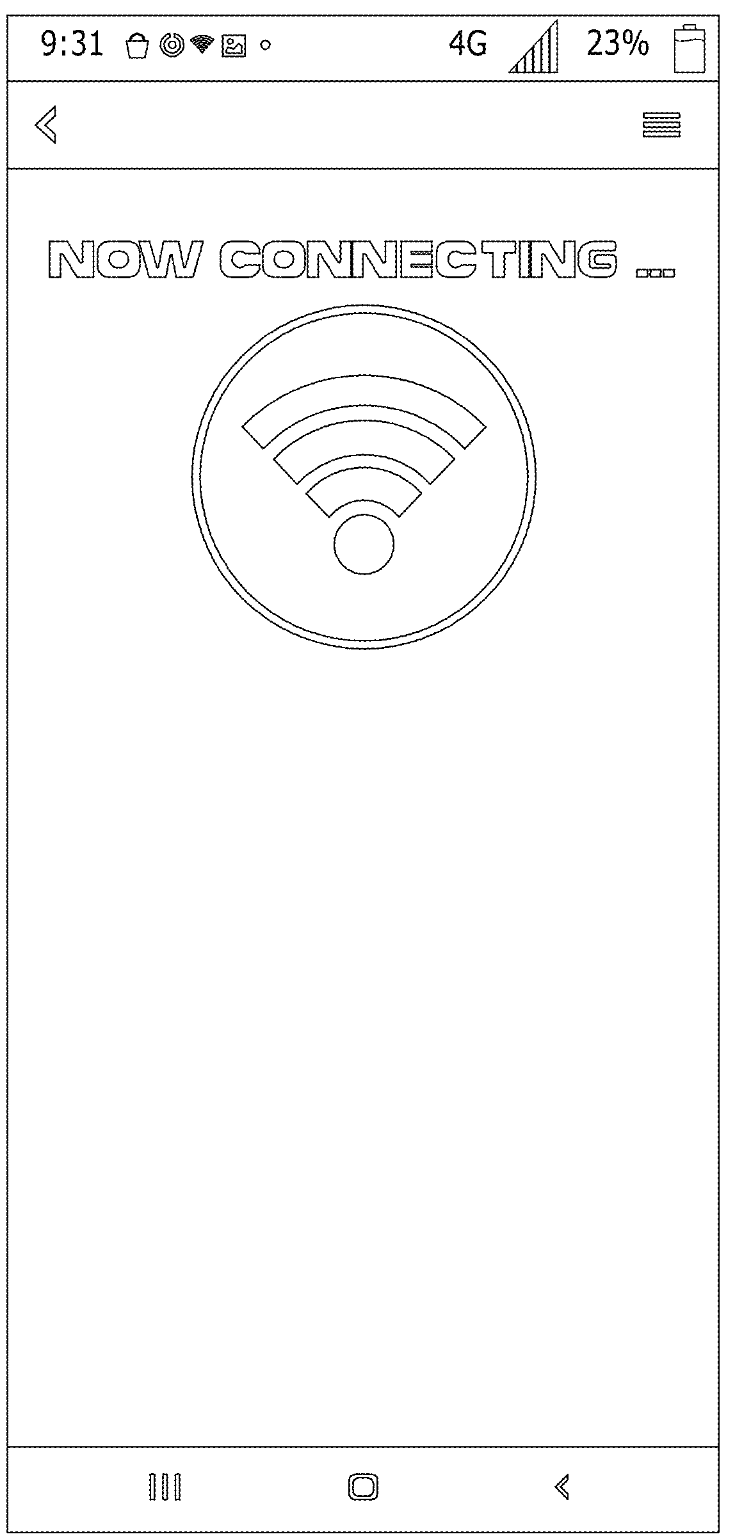

As shown in FIG. 2A, the PON repair application may present a display 200 with instructions for connecting to an ONT 106*a* using NFC. The display 200 may include instructions for connecting to the ONT 106*a* by tapping the client device 150 to an NFC chip on the ONT 106*a*. Then once the user taps the client device 150 to the ONT 106*a*, the PON repair application may present a display 250 indicating the client device 150 is connecting to the ONT 106*a*. The client device 150 may then pair with the ONT 106*a* and establish a communication session between the devices 150, 106*a*.

Figure 3A:
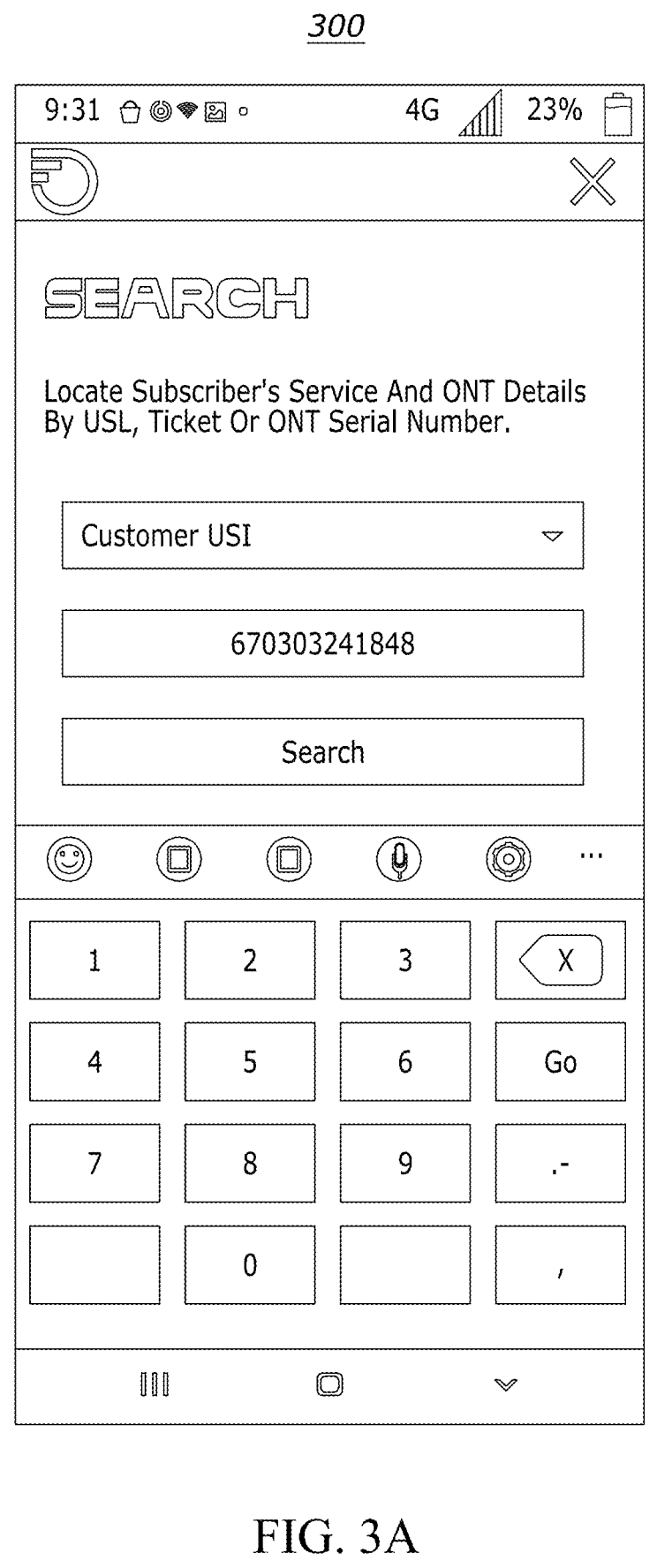
Figure 3B:
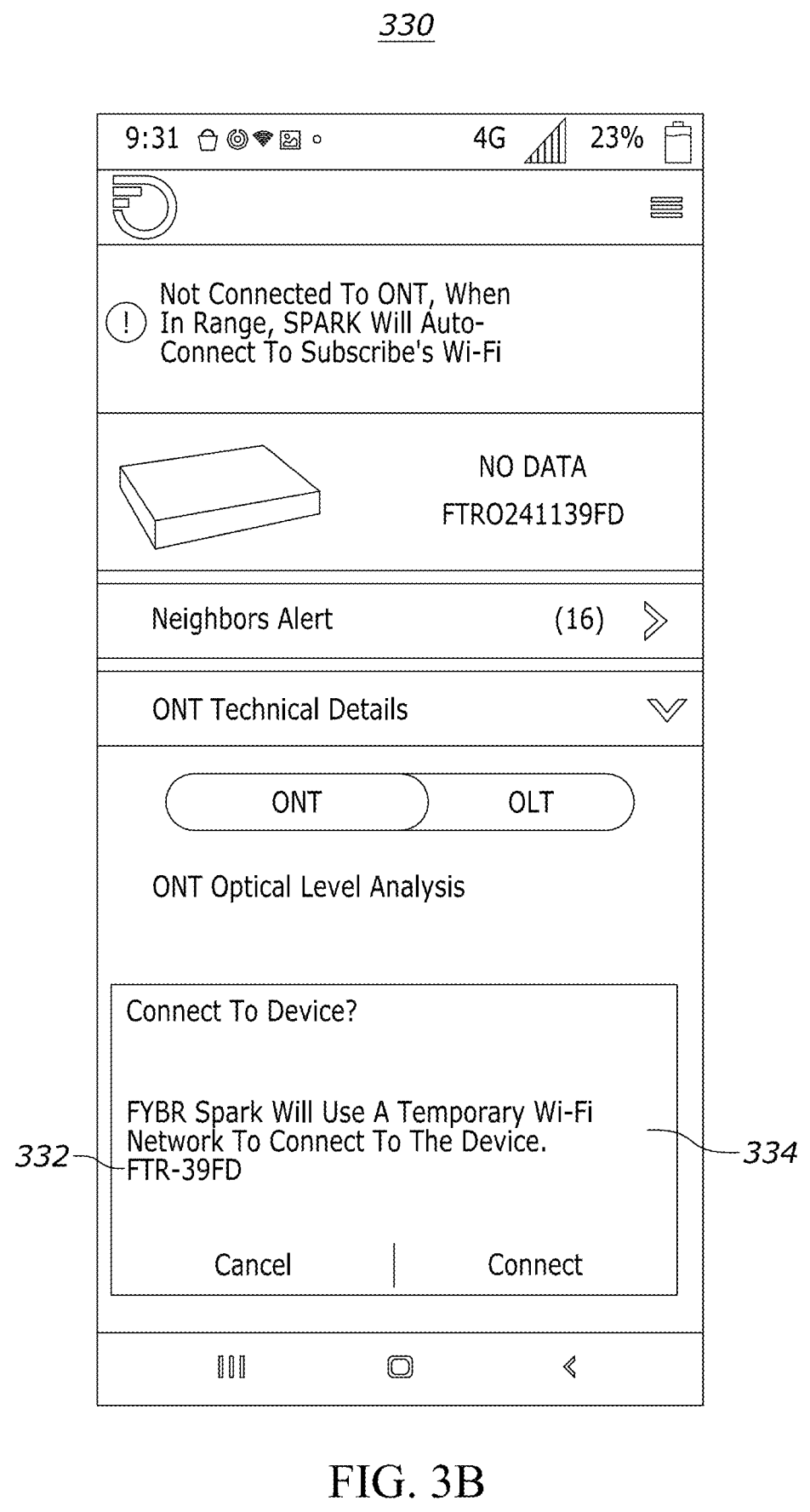

Additionally or alternatively, the client device 150 may connect to the ONT 106*a* using a Wi-Fi communication link. As shown in FIG. 3A, the PON repair application may present a search display 300 for searching for a Wi-Fi network for connecting to the ONT 106*a* by entering a customer identifier, an ONT serial number, or any other suitable identification information for the ONT 106*a*. A user such as a customer or a technician may enter the customer identifier or the ONT serial number in a search bar and select a user control to submit the search query. The PON repair application may then identify the ONT 106*a* based on the search query, and identify a Wi-Fi network for connecting to the ONT 106*a*. FIG. 3B illustrates an example search result display 330 indicating the Wi-Fi network 332 for connecting to the ONT 106*a* related to the search query and including a user control 334 for connecting to the Wi-Fi network. In response to receiving a selection of the user control 334 to connect to the Wi-Fi network 332, the PON repair application may automatically connect to the Wi-Fi network 332 when the client device 150 is within communication range of the Wi-Fi network. For example, once the client device 150 detects a Wi-Fi signal from the Wi-Fi network 332, the client device 150 may automatically connect to the Wi-Fi network 332.

In addition to entering identification information for the ONT 106*a* in a search bar to identify the short-range communication network for connecting to the ONT 106*a*, the ONT 106*a* may include a barcode, such as a quick response (QR) code on the surface of the ONT 106*a* with information for connecting to the short-range communication network. The client device 150 may capture an image of the barcode and analyze the image to obtain the information included in the barcode which may include the name of the Wi-Fi network, a password for connecting to the Wi-Fi network, etc.

Figure 3C:
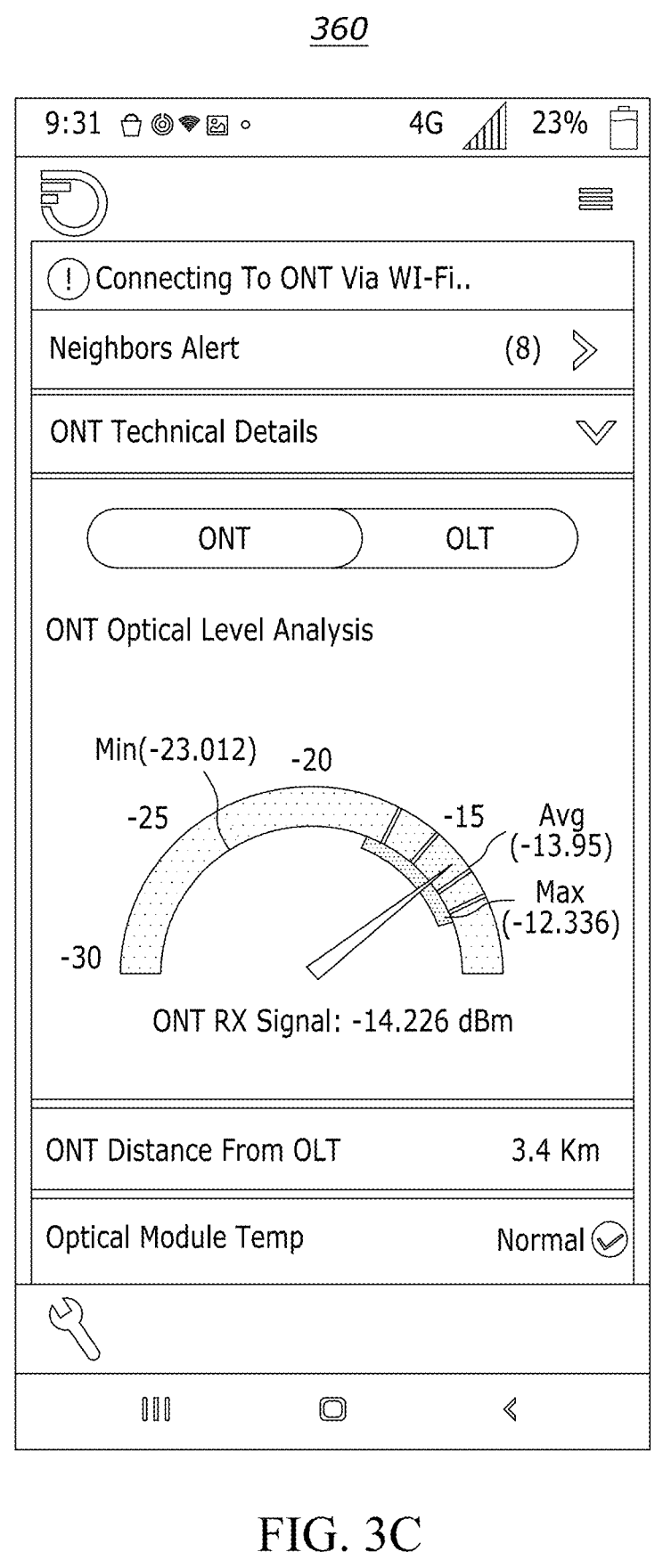

Then once the client device 150 connects to the ONT 106*a* via a short-range communication link, the PON repair application may receive and present diagnostic information from the ONT 106*a* as shown in the diagnostic display 360 of FIG. 3C.

Figure 4A:
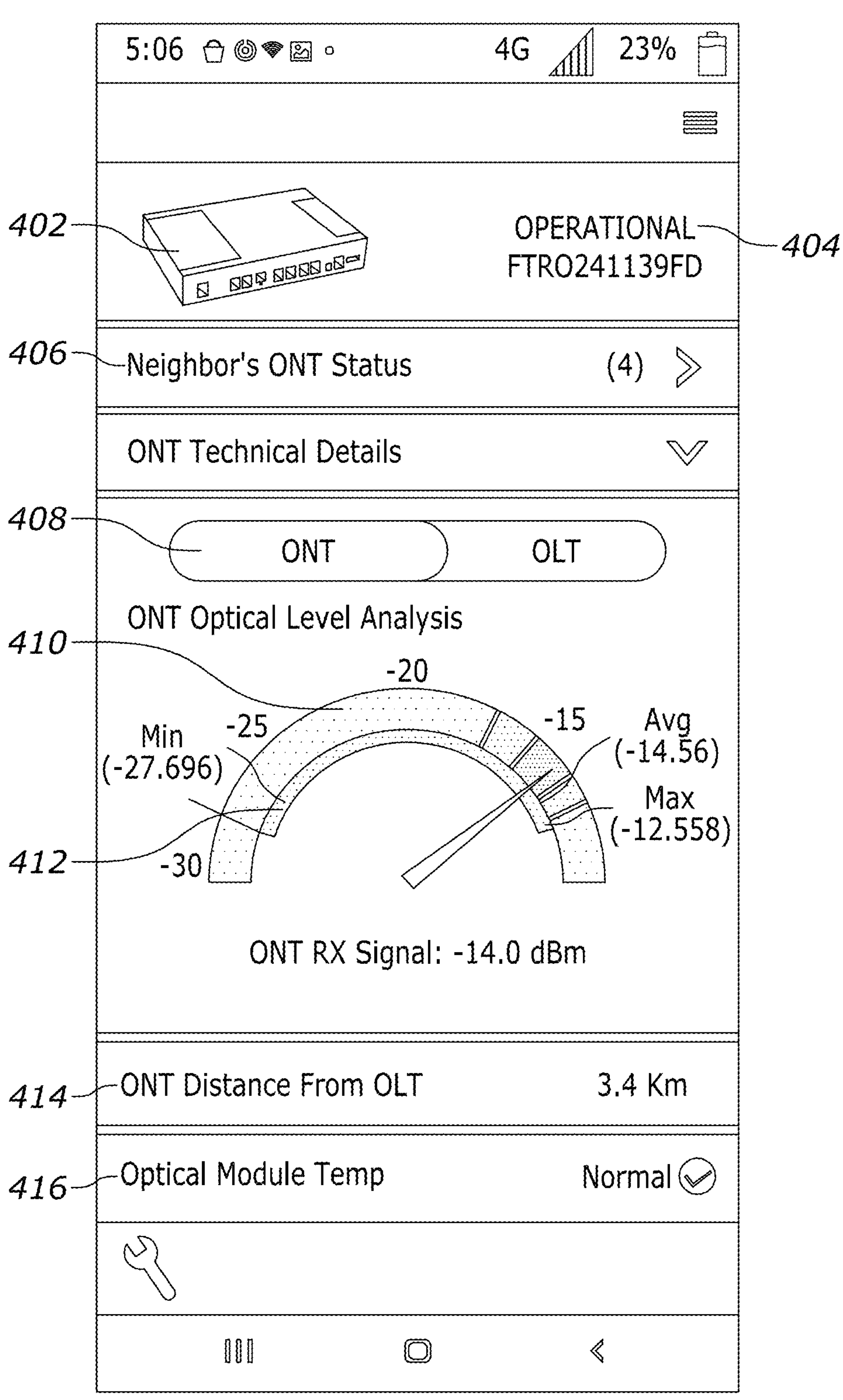
FIGS. 4A and 4B illustrate example displays of a PON repair application which include diagnostic information for the particular ONT and user controls for executing diagnostic tests on the particular ONT, which may be presented on a client device.
Figure 4B:
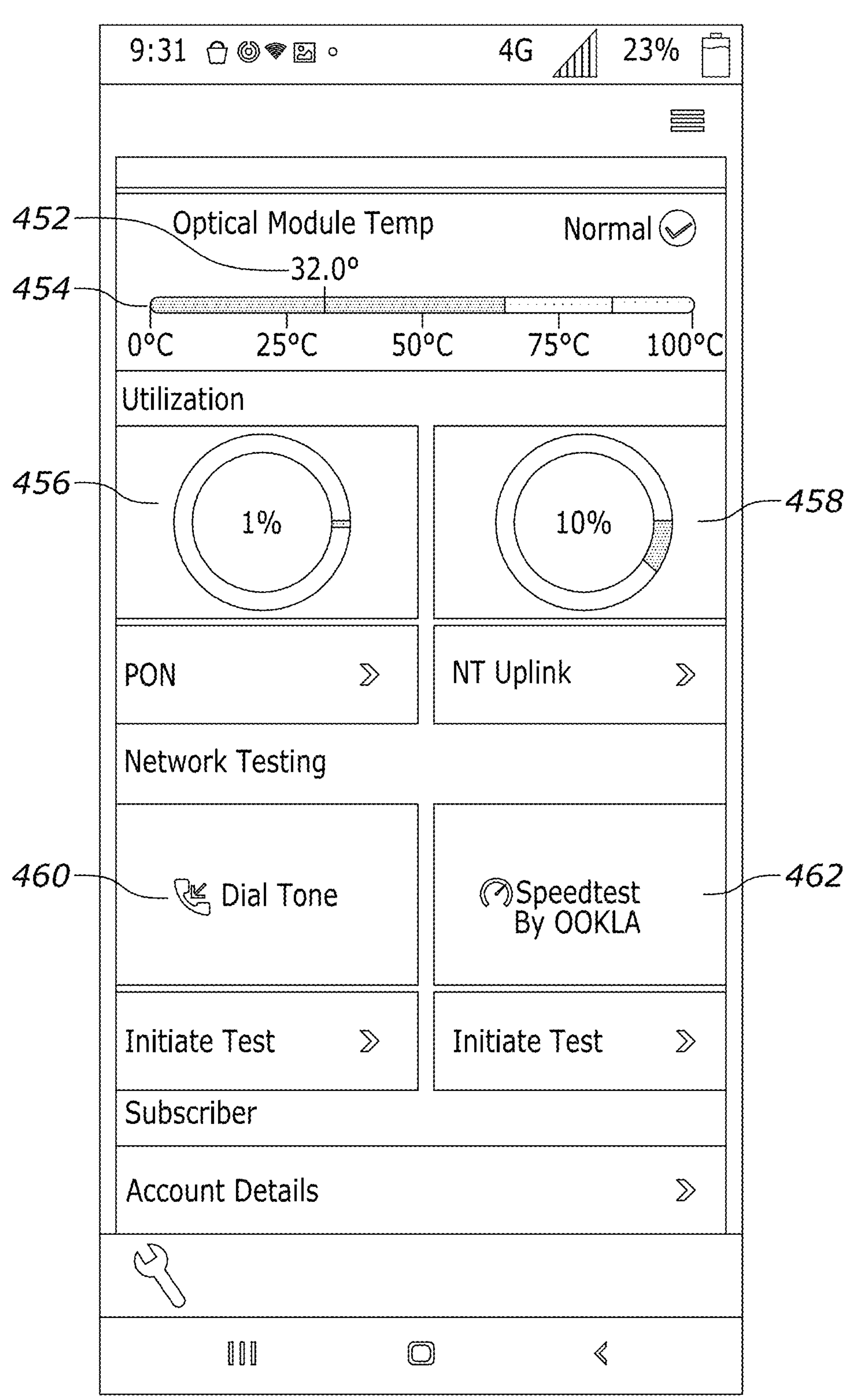

FIGS. 4A and 4B illustrate example diagnostic displays 400, 450 which may be presented by the PON repair application on the client device 150. For example, once the client device 150 connects to the ONT 106*a* via a short-range communication link, the PON repair application may receive real-time diagnostic information from the ONT 106*a*. If the client device 150 is not directly connected to the ONT 106*a*, the client device 150 may receive stored diagnostic information from the server 130 which may not be up to date. In any event, the diagnostic display 400 includes a graphic representation 402 of the ONT 106*a* and an indication of the operational status 404 of the ONT 106*a*. For example, the operational status 404 may indicate the ONT 106*a* is operational or is experiencing a failure and is unable to communicate with the OLT 102.

The diagnostic display 400 also includes an indication of statuses 406 of neighbors' ONTs. In this manner, the user may be able to determine that the ONT 106*a* is not the cause of the network failure and instead a neighbor's ONT is the cause of the network failure. Then the user may contact the neighbor to repair the neighbor's ONT.

Additionally, the diagnostic display 400 includes a user control 408 for selecting an optical terminal in which to present diagnostic information. For example, the user can select to view diagnostic information for the ONT 106*a*, the OLT 102, the FDH 116*a*, the FDT, etc. The ONT 106*a* may receive diagnostic information from the OLT 102, the FDH 116*a*, the FDT, and/or any other optical terminal and transmit the diagnostic information to the client device 150 via the short-range communication link. When the user control 408 is selected for viewing diagnostic information for the ONT 106*a*, the diagnostic display 400 presents a graphic representation 410 indicating the light level at the ONT 106*a*. The graphic representation 410 may include an indication of the ONT light level (−14.0 dBm), an indication of a minimum and maximum light level (−27.696 dBm, −12.558 dBm) for all of the ONTs on the PON, and an indication of an average light level (−14.56 dBm) for all of the ONTs on the PON. Additionally, the graphic representation 410 may include a light level meter gauge having green, yellow, and red color indicators to indicate good, fair, and poor light level ranges, respectively. Still further, the diagnostic display may include a graphic indicator 412 below the light level meter gauge 410 indicating the light level range of all ONTs within a threshold radius (e.g., 1 km) of the ONT 106*a*.

Moreover, the diagnostic display 400 may include an indication of the distance 414 from the ONT 106*a* to the OLT 102 (3.4 km) and an indication of the optical temperature 416 of the ONT 106*a* (Normal).

FIG. 4B illustrates another example diagnostic display 450 which may be presented by the PON repair application on the client device 150. For example, the diagnostic display 450 may be presented when the user scrolls down on the diagnostic display 400 of FIG. 4A. In other implementations, the diagnostic display 450 may be presented in response to receiving a selection of a user control on the diagnostic display 400 to view another page.

In any event, the diagnostic display 450 includes additional information about the optical temperature of the ONT 106*a*. More specifically, the additional information includes a temperature metric 452 (32.0°) and a graphic representation of a temperature gauge 454 having green, yellow, and red color indicators to indicate normal, hot, and very hot temperature ranges, respectively. Furthermore, the diagnostic display 450 includes utilization metrics for the ONT 106*a*. The utilization metrics include a PON utilization metric 456 (1%) and a network terminal (NT) uplink utilization metric 458 (10%).

Additionally, the diagnostic display 450 includes user controls 460, 462 for transmitting control signals to the ONT 106*a* to cause the ONT 106*a* to initiate diagnostic tests including a dial tone test 460 and a speed test 462. The client device 150 may then receive diagnostic information from the ONT 106*a* via the short-range communication link in response to the ONT 106*a* performing the diagnostic test. In response to selecting the user control 462 to initiate a speed test, the ONT 106*a* may receive the control signal from the client device 150 and begin executing a speed test to test the upload and download rates of the ONT 106*a*. Then the ONT 106*a* may transmit the results of the speed test to the client device 150 via the short-range communication link. When the user selects the user control 462 to initiate the speed test, the PON repair application may present a speed test display 500, as shown in FIG. 5.

The speed test display 500 may include a user control 502 for selecting a server for performing the speed test. Then the ONT 106*a* may perform the speed test by transmitting and receiving data to and from the selected server over the fiber optic network and determining upload and download rates of the communications with the selected server. The ONT 106*a* may provide the upload and download rates to the client device 150 via the short-range communication link. Then the speed test display 500 may present indications 504, 506 of the download and upload rates, respectively.

In response to selecting the user control 460 to initiate a dial tone test, the ONT 106*a* may receive a control signal from the client device 150 via the short-range communication link to call the client device 150. The client device 150 may also transmit the client device's phone number to the ONT 106*a*. Then the ONT 106*a* may begin executing the dial tone test to test whether the ONT 106*a* can successfully complete the call with the client device 150. Then the ONT 106*a* may call the client device 150 via the fiber optic network. When the user selects the user control 460 to initiate the dial tone test, the PON repair application may present a dial tone test display 600, as shown in FIG. 6A.

The dial tone test display 600 may include an indication that the user should expect a call back shortly. Then as shown in FIG. 6B, the client device 150 presents an indication of an incoming call for the user to accept with user controls for accepting or denying the call. The user can then determine that the ONT 106*a* passed the dial tone test by being able to initiate a call with the client device 150.

The user may use the diagnostic information from the diagnostic tests and/or from the displays 400-650 to determine the root cause of the network failure and repair or replace the ONT 106*a* or another device in the PON 100. For example, in some scenarios, the user may determine that the ONT 106*a* needs to be replaced and may swap the ONT 106*a* out with a replacement ONT. The user may also order a new ONT to be shipped to the user's residence, for example if the user is a customer and not a technician and does not have a replacement ONT.

In any event, the ONT 106*a* may transmit any suitable diagnostic information to the client device 150 via the short-range communication link which may assist the user in determining how to repair the ONT 106*a* or another device in the PON 100. The diagnostic information may include a download rate at the ONT 106*a*, an upload rate at the ONT 106*a*, a light level metric at the ONT 106, a distance from the ONT 106*a* to the OLT 102, a temperature metric at the ONT 106*a*, a PON utilization metric, an uplink metric for the ONT 106*a*, or any other suitable diagnostic information related to the ONT 106*a* and/or the PON 100. The diagnostic information may also include any suitable diagnostic information from the OLT 102, the FDH 116*a*, the FDT, or any other optical terminal in the PON 100. For example, the diagnostic information may further include diagnostic information from neighboring ONTs, so that the user can determine that a neighbor's ONT is the cause of the network failure. Then the user may contact the neighbor to repair the neighbor's ONT.

In some implementations, when the operational status of the ONT 106*a* is "DOWN," the one or more servers 130 may identify components of the PON which are upstream or downstream of the ONT 106*a*. For example, the one or more servers 130 may identify components either directly or indirectly optically coupled to the ONT 106*a* via the record of the OLT, FDTs, FDHs, splitters, distribution ports, and/or ONTs connected to each other in the data store 132. Then the one or more servers 130 may determine whether service technician client devices 150 connected to any of the components that are either directly or indirectly optically coupled to the ONT 106*a*. If service technician client devices 150 connected to at least two components of the PON 100 including the ONT 106*a*, the one or more servers 130 may provide user controls for initiating a messaging session via a messaging service between the service technician client devices 150.

FIG. 7 illustrates an example status display 700 indicating the operational status of the ONT 106*a* and including a user control for initiating a messaging session with another client device of a service technician repairing a PON device upstream of the ONT 106*a*. The status display 700 includes an indication of the operational status 702 of the ONT 106*a*, which is "DOWN." The status display 700 also includes a prompt 704 for the service technician to chat with another service technician whose client device is connected to a component upstream of the ONT 106*a*. In some implementations, the prompt 704 includes identification information for the upstream component, the second client device connected to the upstream component, and/or the service technician repairing the upstream component.

While the prompt 704 describes one PON device that may affect repair of the ONT 106*a*, this is merely one example. In some scenarios, there may be three, four, five, or more PON devices optically coupled to each other and connected to client devices. The prompt 704 may allow the service technicians for each of the PON devices to communicate with each other.

Additionally, the status display 700 includes a user control 706 for establishing a messaging session via a messaging service between a first client device 150 for the service technician repairing the ONT 106*a* and a second client device for a service technician repairing the component upstream of the ONT 106*a*. In response to receiving a selection of the user control 706, a messaging service provided by the one or more servers 130 may establish a messaging session between the first and second client devices. For example, the messaging service may receive each of the messages transmitted by the client device connected to PON devices that are upstream or downstream of each other. Then the messaging service may present the messages on a display which is provided to each of the client devices in a group chat format or one on one messaging format.

FIG. 8 illustrates an example messaging display 800 for a messaging session between a first service technician repairing the ONT 106*a* and a second service technician repairing the PON device. The messaging display 800 includes messages from the second service technician repairing the PON device. The messaging display 800 may include an indication 802 of the second service technician repairing the PON device. In some implementations, the messaging display 800 may also include an indication of the PON device. The messaging display 800 includes messages from the first and second service technicians via the first and second client devices. More specifically, the message 804 indicates that a PON device upstream from the ONT 106*a* (an FDH) needs to be repaired, which may affect the repair/performance of the ONT 106*a*. For example, if the FDH is down, the ONT 106*a* will not receive optical service even if the ONT 106*a* is working properly and/or has been repaired. The message 804 also includes an estimated amount of time for repairing the FDH (2 hours).

The message 806 includes an updated repair status for the FDH. More specifically, the message 806 indicates that the FDH has been repaired and is operational. Accordingly, based on the updated repair status for the FDH, the service technician can begin repairing the ONT 106*a*. The first service technician may receive periodic updates regarding the repair status of the PON device from the second service technician. These updates may indicate that repair has begun, that repair is in progress, that repair is complete, etc. These updates may also include updated time estimates for repairing the PON device. In response to receiving an indication that repair of the PON device is complete, the first service technician may perform the diagnostics described above with reference to FIGS. 4A-6B.

For example, in response to the message 806 indicating that repair of the FDH is complete, the first client device 150 may receive diagnostic information from the ONT 106*a* via the short-range communication link between the first client device 150 and the ONT 106*a*. The diagnostic information may include a download rate at the ONT 106*a*, an upload rate at the ONT 106*a*, a light level metric at the ONT 106, a distance from the ONT 106*a* to the OLT 102, a temperature metric at the ONT 106*a*, a PON utilization metric, an uplink metric for the ONT 106*a*, or any other suitable diagnostic information related to the ONT 106*a* and/or the PON 100.

In some scenarios, the diagnostic information may indicate that the ONT 106*a* is operational, for example when the download/upload rates at the ONT 106*a* exceed threshold rates, the light level metric is within a desired range, etc. Accordingly, the first client device 150 may determine that repair of the fiber distribution hub resolved a network failure and the ONT 106*a* is operational. Then the first client device 150 may change the operational status 702 to indicate that the ONT 106*a* is operational.

In other scenarios, the diagnostic information may still indicate that the ONT 106*a* is not operational even after the upstream PON device has been repaired. The PON repair application may then generate and provide instructions for repairing the ONT 106*a* based on the diagnostic information. The PON repair application may adjust the instructions based on the repair status of the PON device. More specifically, the PON repair application may receive the diagnostic information from the client device 150 and may analyze the diagnostic information to determine the root cause of the network failure. Additionally, the PON repair application may receive other sensor data indicating the current environment around the ONT 106*a*. For example, the PON repair application may obtain images of the ONT 106*a* from the camera. In some scenarios such as when the client device 150 is smart glasses or a VR headset, the camera view may be same as the user's view and the PON repair application may obtain real-world images of the user's current view of optical equipment. The PON repair application may also receive infrared data via an infrared sensor at the client device 150. For example, the ONT 106*a* may transmit IR signals that indicate various issues with the ONT 106*a*.

The PON repair application may then analyze the sensor data indicating the current environment at the ONT 106*a* to determine the cause of the network failure. For example, the PON repair application may analyze the images to identify a blinking LED on the ONT. Each LED may signal a different issue and the LED may emit light with multiple blinking patterns or in multiple different colors which each signal a different issue. The PON repair application may then determine the cause of the network failure based on which LEDs are lit up, which color each LED emits, and/or which blinking pattern each LED emits (e.g., 5 consecutive blinks, two blinks followed by a 5 second pause followed by 2 more blinks, etc.). The PON repair application may analyze the images using object recognition and/or optical character recognition (OCR) techniques to identify the LEDs that are lit up and/or their blinking patterns.

More specifically, the PON repair application may analyze a portion (also referred to herein as an "object") of an image and identify features of the object within the image, such as the geometry of the edges of the object, and RGB pixel values or colors within the object.

These features may be identified by detecting stable regions within the object that are detectable regardless of blur, motion, distortion, orientation, illumination, scaling, and/or other changes in camera perspective. The stable regions may be extracted from the object using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the object, such as edges within the object. A bounding box may be formed around a keypoint and the portion of the object created by the bounding box may be a feature.

In any event, the PON repair application may compare the features identified for the object to features from template objects (also referred to herein as "template features") using image classification and/or machine learning techniques, where the template objects may include optical terminals or components of optical terminals, such as LEDs on an optical terminal, ports, fibers connected to the optical terminal, etc. The machine learning techniques may include linear regression, polynomial regression, logistic regression, random forests, boosting, nearest neighbors, Bayesian networks, neural networks, support vector machines, or any other suitable machine learning technique. The template objects may also include other representations which are not of optical terminals. Then each of these template features may be compared to the features for an object.

In some embodiments, the template features may be compared to the features for an object using a nearest neighbors algorithm. The nearest neighbors algorithm may identify template features which are the closest to the features of the object by creating numerical representations of the features to generate feature vectors, such as a pixel width and height of the object, and RGB pixel values for the object. The numerical representations of the features or feature vectors of the object may be compared to the feature vectors of template objects to determine a vector distance between the features of the object and each template object. The PON repair application may then identify the object based on the amount of similarity, or the vector distance in the nearest neighbors algorithm, between the features for the object and the features for template objects. If the closest template objects represent an LED, the object is identified as an LED. If the closest template objects represent an ONT, the object is identified as an ONT. Additionally, if the closest template objects represent a fiber, the object is identified as a fiber.

In any event, the PON repair application may identify an LED in an image and identify the signal to which the LED corresponds based on the shape of the LED or based on text which is adjacent to the LED. For example, if the text is "Power," the PON repair application may determine that the LED represents a power signal and if the LED is off, the PON repair application may determine that the power is off for the ONT 106*a*. Additionally, if the text is "Service," the PON repair application may determine that the LED represents an Internet service signal. If the LED is off, the PON repair application may determine that the ONT 106*a* is not connected to an Internet service provider.

In another example, the PON repair application may analyze the images to determine that a fiber is bent. For example, the PON repair application may identify the fiber using the objection recognition techniques described above. The PON repair application may then determine the geometry of the identified fiber and if the fiber curves at an angle which is more than a threshold angle (e.g., 45 degrees), the PON repair application may determine that the fiber is bent. In yet another example, the PON repair application may determine that the fiber is dirty, for example based on the colors of the fiber or based on the ONT 106*a* detecting Rayleigh scattering in the fiber according to attenuation in the detected light level. In another example, the PON repair application may determine that the fiber is broken by detecting cracks or breaks in the fiber.

The PON repair application may also analyze the diagnostic information from the ONT 106*a* and/or other sensor data to determine that the fiber is broken or bent. In other implementations, the PON repair application may analyze the diagnostic information and/or other sensor data to determine that the fiber is the cause of the network failure. Then the PON repair application may instruct the user to look at the fiber to determine whether the fiber is broken, bent, or dirty and to repair the ONT 106*a* accordingly based on the user's findings.

In addition to identifying issues with the fiber, the PON repair application may analyze the diagnostic information from the ONT 106*a* and/or other sensor data to determine that the ONT 106*a* needs to be replaced, that the ONT 106*a* needs to be reset (e.g., by turning the power on and off), that an outlet powering the ONT 106*a* needs to be reset, that an Ethernet cable connected to the ONT 106*a* needs to be replaced, that an optical splitter needs to be replaced 114*a*, etc.

Then in response to determining the cause of the network failure, the PON repair application may generate and provide instructions for repairing the ONT 106*a*. For example, when a fiber is bent, the PON repair application may generate instructions to straighten out the fiber. When the fiber is dirty, the PON repair application may generate instructions for cleaning the fiber. When the fiber is broken, the PON repair application may generate instructions for replacing the fiber with another fiber. In another example, when the ONT 106*a* needs to be reset, the PON repair application may generate instructions for resetting the ONT 106*a*. When the ONT 106*a* is not receiving power from the outlet, the PON repair application may generate instructions for resetting the outlet to the ONT 106*a*. Furthermore, when the ONT 106*a* needs to be replaced, the PON repair application may generate instructions for removing the current ONT 106*a* and installing a new ONT.

While these are a few examples of the causes of network failures and corresponding instructions for repairing the network failures, the PON repair application may identify any suitable cause of a network failure and generate corresponding instructions for repairing the network failure according to the identified cause.

In any event, the PON repair application may then present the instructions to the user for example, as step-by-step instructions as the user repairs the ONT 106*a*. The PON repair application may present the instructions audibly via a speaker of the client device 150 or visually on a display. In some scenarios, the PON repair application may transition to an augmented reality mode that presents real-world imagery on a transparent display in the field of view of the client device 150, and more specifically the camera view of the camera. The real-world imagery may be the user's view of the area in front of them so that they may view the instructions as they are repairing the ONT 106*a* or the FDH 116*a*. In some implementations, the PON repair application may overlay the instructions on the transparent display in a display area within the transparent display that does not obstruct the user's view of the ONT 106*a* or the FDH 116*a*. The PON repair application may identify the ONT 106*a* or the FDH 116*a* within the real-world imagery using the object recognition techniques described above. Then the PON repair application may identify a display area within the real-world imagery that does not obstruct the ONT 106*a* or the FDH 116*a*. For example, the display area may be above, below, to the left, or to the right of the ONT 106*a* or the FDH 116*a*. The PON repair application may overlay the instructions on the real-world imagery within the identified display area.

In this manner, when the client device 150 is smart glasses or a VR headset, the user may look at the ONT 106*a* or the FDH 116*a* and see instructions for repairing the ONT 106*a* or the FDH 116*a* in their field of view as they repair the ONT 106*a* or the FDH 116*a*. When the client device 150 is a tablet or smart phone, the user may also be able to hold their tablet or smart phone up to the ONT 106*a* or the FDH 116*a* and see the instructions for repairing the ONT 106*a* or the FDH 116*a*.

In addition to overlaying text instructions on the real-world imagery in the augmented reality mode, the PON repair application may overlay augmented reality features on the real-world imagery to assist the user in repairing the ONT 106*a* or other optical terminal, such as graphics or icons which highlight portions of the real-world imagery. For example, when the instructions are to examine a particular fiber, the PON repair application may identify the location of the particular fiber within the real-world imagery using the object recognition techniques described above. For example, the PON repair application may identify the fiber and identify the pixel coordinates of the fiber within the real-world imagery. Then the PON repair application may overlay a graphic at the identified location for the fiber to highlight the fiber relative to other objects within the image. For example, the graphic may be the same size and shape as the fiber in a bright yellow color, so that the fiber appears bright yellow and is easily noticeable by the user.

More generally, the PON repair application may identify location(s) within the real-world imagery for the user to view and may overlay augmented reality feature(s) at those location(s). FIG. 9 illustrates an example transparent display 900 of a client device 150 with real-world imagery in the field of view of a user 10, where the PON repair application is in an augmented reality mode. The real-world imagery includes the ONT 106*a*. Additionally, the transparent display includes a set of step-by-step instructions 902 for repairing the ONT 106*a* in a text format. The set of step-by-step instructions 902 are presented within a display area which does not obstruct the ONT 106*a*. In this manner, the user may view and repair the ONT 106*a* while viewing the instructions 902.

The real-world imagery also includes a power cord 906 connected to a power outlet for the ONT 106*a*, and two optical fibers 908, 910 connected to ports 4 and 8 of the ONT 106*a*, respectively. The instructions 902 are to disconnect the fiber 908 from port 4 and replace it with a new fiber optic cable. The new fiber optic cable may be inserted into a different distribution port than the previous fiber optic cable, and the service technician may enter in the different distribution port in the PON repair application to update the record.

As mentioned above, the PON repair application may adjust the instructions based on the repair status of the PON device. For example, while the PON repair application may initially determine that the fiber 908 needs to be disconnected from port 4 and replaced, the PON repair application may adjust the instructions in response to receiving an indication via the messaging service that an upstream component needs to be repaired (e.g., the FDH optically coupled to the ONT 106*a*). Instead, as shown in FIG. 10, the PON repair application may update the instructions 1002 and/or include a further instruction explaining that the FDH optically coupled to the ONT 106*a* is under repair, and instructing the service technician not to repair the ONT 106*a* until repair of the FDH is complete. Then in response to receiving an indication that the repair of the FDH is complete for example via the messaging service, the PON repair application may once again present the instruction 902 shown in FIG. 9.

Figure 11:
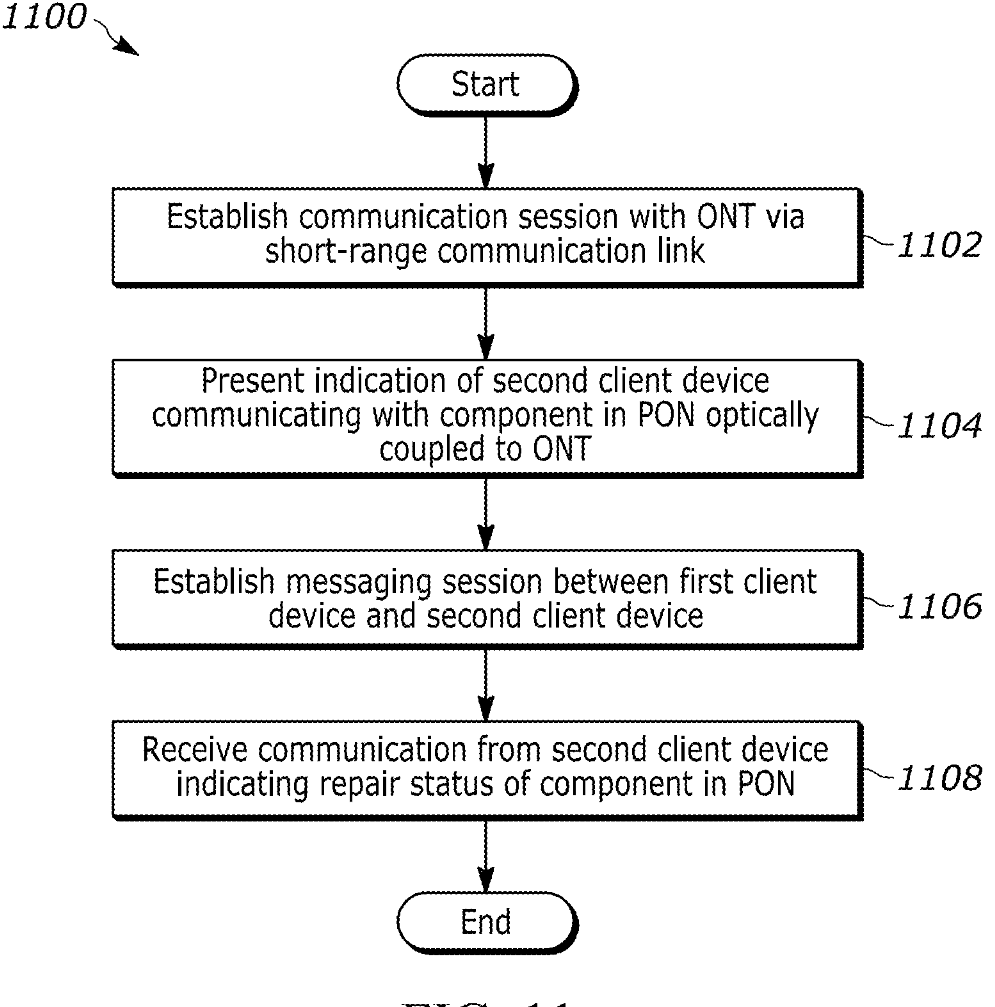
FIG. 11 is a flowchart representative of an example method for communicating between client devices connected to components in a PON, which may be performed by a client device of FIG. 1.

FIG. 11 depicts a flow diagram of an example method 1100 for communicating between client devices connected to components in a PON 100. The method 1100 may be performed by the first client device 150. At block 1102, the first client device 150 establishes a communication session with a particular ONT 106*a* via a short-range communication link. For example, the first client device 150 and the particular ONT 106*a* may connect using Wi-Fi, Bluetooth, or NFC. More specifically, a user may tap the first client device 150 to the particular ONT 106*a* to cause the PON repair application to transmit an NFC signal to the particular ONT 106*a* requesting to pair the devices. The particular ONT 106*a* may receive the NFC signal and establish a communication session between the two devices 150, 106*a* in response to the request. In another example, the particular ONT 106*a* may broadcast a Wi-Fi signal. When the first client device 150 is within communication range of the particular ONT 106*a*, the PON repair application may receive the Wi-Fi signal and may request to connect to the particular ONT 106*a* via the broadcasted Wi-Fi network.

At block 1104, the first client device 150 presents an indication of a second client device communicating with a component in the PON which is optically coupled to the ONT 106*a*. For example, the indication may be the prompt 704 shown in FIG. 7 which explains that a technician is connected to a component of the PON that may affect repair of the ONT 106*a*. In some implementations, the first client device 150 receives a communication from the one or more servers 130 indicating that the second client device is communicating with a component in the PON which is optically coupled to the ONT 106*a*. For example, the one or more servers 130 may receive communications from client devices 150 indicating that they connected to components of the PON. The one or more servers 130 may then compare the components to the record of connected components from the data store 132 to determine whether any of the components are upstream or downstream of each other. In response to determining that a second client device is connected to a component upstream of the ONT 106*a*, the one or more servers 130 may transmit a message indicating as such to the first client device 150.

Then at block 1106, the first client device 150 may establish a messaging session via a messaging service with the second client device. For example, the service technician for the first client device 150 may select a user control 706 to initiate a messaging session. Accordingly, the one or more servers 130 may generate and provide a messaging display 800 to the first and second client devices. Then the one or more servers 130 may receive messages from the first and second client devices and provide the messages to the first and second client devices via the messaging display 800.

At block 1108, the first client device 150 may receive a communication from the second client device via the messaging service indicating the repair status of the component in the PON 100. The first client device 150 may present the communication via the messaging display 800. Because the component is upstream of the ONT 106*a*, repair of the ONT 106*a* depends on the repair status of the component.

The repair status may indicate that the component needs repair, such that the ONT will not be operational until the component is repaired. The repair status may also include an estimated amount of time for repairing the component. Still further, the repair status may indicate whether repair has begun, whether repair is in progress, whether repair has been completed, etc.

In some implementations, the first client device 150 may receive periodic updates regarding the repair status of the component. For example, the periodic updates may include updated time estimates and/or updated statuses from awaiting repair to repair has begun to repair is in progress to repair complete.

In any event, the first client device 150 may then provide a set of instructions for repairing the ONT 106*a*, where the set of instructions are adjusted based on the repair status of the component. For example, if the repair has not been completed, the set of instructions may be adjusted to instruct the service technician not to begin repairing the ONT 106*a* until repair of the component has been completed. Then in response to receiving a periodic update indicating that repair of the component has been completed, the first client device 150 may adjust the instructions to instruct the service technician to run the diagnostic tests once again before beginning any repairs. In this manner, if the ONT 106*a* was down due to a failure in the upstream component, the ONT 106*a* may not need any repairs. Instead, the diagnostic tests may reveal that the ONT 106*a* is operational after the upstream component has been repaired. In another scenario, the diagnostic tests after the upstream component has been repaired may indicate a different network failure which requires a different type of repair from the initial set of instructions. Accordingly, the first client device 150 may present an updated set of instructions for performing the different type of repair.

ADDITIONAL CONSIDERATIONS

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations.

Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. A method for communicating between client devices connected to components in a Passive Optical Network (PON), the method comprising: establishing a communication session, by a first client device via a short-range communication link, with an optical network terminal (ONT) in a PON, wherein the PON includes an optical line terminal (OLT) optically connected to the ONT via one or more optical fibers; presenting, by the first client device via a PON repair application, an indication of a second client device communicating with a component in the PON optically coupled to the ONT, wherein the ONT is downstream of the component; establishing, by the first client device via a messaging service of the PON repair application, a messaging session between the first client device and the second client device; and receiving, by the first client device via the messaging service in the PON repair application, a communication from the second client device indicating a repair status of the component in the PON, wherein repair of the ONT depends on the repair status of the component.

2. The method of example 1, further comprising: adjusting, by the first client device via the PON repair application, a set of instructions for repairing the ONT based on the repair status of the component.

3. The method of example 1 or example 2, further comprising: periodically receiving, by the first client device via the messaging service in the PON repair application, updates regarding the repair status of the component in the PON.

4. The method of any of the preceding examples, wherein the component is a fiber distribution hub optically coupled to the ONT, and wherein the repair status indicates that the fiber distribution hub is being repaired.

5. The method of any of the preceding examples, wherein periodically receiving updates includes: receiving, by the first client device via the messaging service in the PON repair application, an indication that repair of the fiber distribution hub is complete.

6. The method of any of the preceding examples, further comprising: in response to receiving the indication that repair of the fiber distribution hub is complete, receiving, at the first client device from the ONT via the short-range communication link, diagnostic information for the ONT; generating, by the first client device, a set of instructions for repairing the ONT based on the diagnostic information; and providing, by the first client device, the set of instructions for a user to follow to repair the ONT.

7. The method of any of the preceding examples, further comprising: analyzing, by the first client device, the diagnostic information to detect a cause of a network failure corresponding to the ONT.

8. The method of any of the preceding examples, further comprising: in response to receiving the indication that repair of the fiber distribution hub is complete, receiving, at the first client device from the ONT via the short-range communication link, diagnostic information for the ONT; determining, by the first client device, that the repair of the fiber distribution hub resolved a network failure and the ONT is operational; and presenting, by the first client device via the PON repair application, an indication that the ONT is operational.

9. The method of any of the preceding examples, wherein receiving the communication indicating the repair status of the component includes: receiving, by the first client device via the messaging service in the PON repair application, an estimated amount of time for repairing the component.

10. The method of any of the preceding examples, wherein receiving the communication indicating the repair status of the component includes: receiving, by the first client device via the messaging service in the PON repair application, an indication that the component needs to be repaired, such that the ONT will not be operational until the component is repaired.

11. A first client device for repairing a network failure in a Passive Optical Network (PON) by communicating with a second client device connected to a component in the PON, the first client device comprising: one or more processors; a non-transitory computer-readable memory storing instructions thereon that, when executed by the one or more processors, cause the first client device to: establish a communication session, via a short-range communication link, with an optical network terminal (ONT) in a PON, wherein the PON includes an optical line terminal (OLT) optically connected to the ONT via one or more optical fibers; present, via a PON repair application, an indication of a second client device communicating with a component in the PON optically coupled to the ONT, wherein the ONT is downstream of the component; establish, via a messaging service of the PON repair application, a messaging session between the first client device and the second client device; and receive, via the messaging service in the PON repair application, a communication from the second client device indicating a repair status of the component in the PON, wherein repair of the ONT depends on the repair status of the component.

12. The first client device of example 11, wherein the instructions further cause the first client device to: adjust, via the PON repair application, a set of instructions for repairing the ONT based on the repair status of the component.

13. The first client device of example 11 or example 12, wherein the instructions further cause the first client device to: periodically receive, via the messaging service in the PON repair application, updates regarding the repair status of the component in the PON.

14. The first client device of any of examples 11 to 13, wherein the component is a fiber distribution hub optically coupled to the ONT, and wherein the repair status indicates that the fiber distribution hub is being repaired.

15. The first client device of any of examples 11 to 14, wherein the updates include an indication that repair of the fiber distribution hub is complete.

16. The first client device of any of examples 11 to 15, wherein the instructions further cause the first client device to: in response to receiving the indication that repair of the fiber distribution hub is complete, receive, from the ONT via the short-range communication link, diagnostic information for the ONT; generate a set of instructions for repairing the ONT based on the diagnostic information; and provide the set of instructions for a user to follow to repair the ONT.

17. A method for establishing a messaging session between client devices connected to components of a Passive Optical Network (PON) which are optically coupled to each other, the method comprising: receiving, by one or more processors, an indication of a first client device in communication with an optical network terminal (ONT) in a PON; receiving, by the one or more processors, an indication of a second client device in communication with a component in the PON optically coupled to the ONT, wherein the ONT is downstream of the component; initiating, by the one or more processors, a messaging session between the first and second client devices; receiving, by the one or more processors, a communication from the second client device indicating a repair status of the component in the PON; and transmitting, by the one or more processors, the communication to the first client device to alert the first client device of the repair status of the component.

18. The method of example 17, further comprising: periodically receiving, by the one or more processors from the second client device, updates regarding the repair status of the component in the PON; and transmitting, by the one or more processors, the periodic updates to the first client device.

19. The method of example 17 or example 18, wherein receiving the communication indicating the repair status of the component includes: receiving, by the one or more processors, an estimated amount of time for repairing the component.

20. The method of any of examples 17 to 19, wherein receiving the communication indicating the repair status of the component includes: receiving, by the one or more processors, an indication that the component needs to be repaired, such that the ONT will not be operational until the component is repaired.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for communicating between client devices connected to components in a Passive Optical Network (PON), the method comprising:

establishing a communication session, by a first client device via a short-range communication link, with an optical network terminal (ONT) in a PON, wherein the PON includes an optical line terminal (OLT) optically connected to the ONT via one or more optical fibers;

presenting, by the first client device via a PON repair application, an indication of a second client device communicating with a component in the PON optically coupled to the ONT, wherein the ONT is downstream of the component;

establishing, by the first client device via a messaging service of the PON repair application, a messaging session between the first client device and the second client device; and receiving, by the first client device via the messaging service in the PON repair application, a communication from the second client device indicating a repair status of the component in the PON, wherein repair of the ONT depends on the repair status of the component.

2. The method of claim 1, further comprising:

adjusting, by the first client device via the PON repair application, a set of instructions for repairing the ONT based on the repair status of the component.

3. The method of claim 1, further comprising:

periodically receiving, by the first client device via the messaging service in the PON repair application, updates regarding the repair status of the component in the PON.

4. The method of claim 3, wherein the component is a fiber distribution hub optically coupled to the ONT, and wherein the repair status indicates that the fiber distribution hub is being repaired.

5. The method of claim 4, wherein periodically receiving updates includes:

receiving, by the first client device via the messaging service in the PON repair application, an indication that repair of the fiber distribution hub is complete.

6. The method of claim 5, further comprising:

in response to receiving the indication that repair of the fiber distribution hub is complete, receiving, at the first client device from the ONT via the short-range communication link, diagnostic information for the ONT;

generating, by the first client device, a set of instructions for repairing the ONT based on the diagnostic information; and providing, by the first client device, the set of instructions for a user to follow to repair the ONT.

7. The method of claim 6, further comprising:

analyzing, by the first client device, the diagnostic information to detect a cause of a network failure corresponding to the ONT.

8. The method of claim 5, further comprising:

in response to receiving the indication that repair of the fiber distribution hub is complete, receiving, at the first client device from the ONT via the short-range communication link, diagnostic information for the ONT;

determining, by the first client device, that the repair of the fiber distribution hub resolved a network failure and the ONT is operational; and presenting, by the first client device via the PON repair application, an indication that the ONT is operational.

9. The method of claim 1, wherein receiving the communication indicating the repair status of the component includes:

receiving, by the first client device via the messaging service in the PON repair application, an estimated amount of time for repairing the component.

10. The method of claim 1, wherein receiving the communication indicating the repair status of the component includes:

receiving, by the first client device via the messaging service in the PON repair application, an indication that the component needs to be repaired, such that the ONT will not be operational until the component is repaired.

11. A first client device for repairing a network failure in a Passive Optical Network (PON) by communicating with a second client device connected to a component in the PON, the first client device comprising:

one or more processors;

a non-transitory computer-readable memory storing instructions thereon that, when executed by the one or more processors, cause the first client device to:

establish a communication session, via a short-range communication link, with an optical network terminal (ONT) in a PON, wherein the PON includes an optical line terminal (OLT) optically connected to the ONT via one or more optical fibers;

present, via a PON repair application, an indication of a second client device communicating with a component in the PON optically coupled to the ONT, wherein the ONT is downstream of the component;

establish, via a messaging service of the PON repair application, a messaging session between the first client device and the second client device; and receive, via the messaging service in the PON repair application, a communication from the second client device indicating a repair status of the component in the PON, wherein repair of the ONT depends on the repair status of the component.

12. The first client device of claim 11, wherein the instructions further cause the first client device to:

adjust, via the PON repair application, a set of instructions for repairing the ONT based on the repair status of the component.

13. The first client device of claim 11, wherein the instructions further cause the first client device to:

periodically receive, via the messaging service in the PON repair application, updates regarding the repair status of the component in the PON.

14. The first client device of claim 13, wherein the component is a fiber distribution hub optically coupled to the ONT, and wherein the repair status indicates that the fiber distribution hub is being repaired.

15. The first client device of claim 14, wherein the updates include an indication that repair of the fiber distribution hub is complete.

16. The first client device of claim 15, wherein the instructions further cause the first client device to:

in response to receiving the indication that repair of the fiber distribution hub is complete, receive, from the ONT via the short-range communication link, diagnostic information for the ONT;

generate a set of instructions for repairing the ONT based on the diagnostic information; and provide the set of instructions for a user to follow to repair the ONT.

17. A method for establishing a messaging session between client devices connected to components of a Passive Optical Network (PON) which are optically coupled to each other, the method comprising:

receiving, by one or more processors, an indication of a first client device in communication with an optical network terminal (ONT) in a PON;

receiving, by the one or more processors, an indication of a second client device in communication with a component in the PON optically coupled to the ONT, wherein the ONT is downstream of the component;

initiating, by the one or more processors, a messaging session between the first and second client devices;

receiving, by the one or more processors, a communication from the second client device indicating a repair status of the component in the PON; and transmitting, by the one or more processors, the communication to the first client device to alert the first client device of the repair status of the component.

18. The method of claim 17, further comprising:

periodically receiving, by the one or more processors from the second client device, updates regarding the repair status of the component in the PON; and transmitting, by the one or more processors, the periodic updates to the first client device.

19. The method of claim 17, wherein receiving the communication indicating the repair status of the component includes:

receiving, by the one or more processors, an estimated amount of time for repairing the component.

20. The method of claim 17, wherein receiving the communication indicating the repair status of the component includes:

receiving, by the one or more processors, an indication that the component needs to be repaired, such that the ONT will not be operational until the component is repaired.

* * * * *